US012325368B2

(12) United States Patent
Takahashi et al.

(10) Patent No.: US 12,325,368 B2
(45) Date of Patent: Jun. 10, 2025

(54) DRIVE CIRCUIT FOR CONTROLLING CONDUCTION STATES OF MULTIPLE LOADS

(71) Applicant: DENSO CORPORATION, Kariya (JP)

(72) Inventors: Yusuke Takahashi, Kariya (JP); Akito Ito, Kariya (JP); Kotaro Tanaka, Kariya (JP); Keisuke Atsumi, Kariya (JP)

(73) Assignee: DENSO CORPORATION, Kariya (JP)

( * ) Notice: Subject to any disclaimer, the term of this patent is extended or adjusted under 35 U.S.C. 154(b) by 454 days.

(21) Appl. No.: 17/462,196

(22) Filed: Aug. 31, 2021

(65) Prior Publication Data

US 2022/0063523 A1   Mar. 3, 2022

(30) Foreign Application Priority Data

Sep. 2, 2020   (JP) ................................ 2020-147785

(51) Int. Cl.
*B60R 16/023*   (2006.01)
*B60L 3/00*   (2019.01)
(Continued)

(52) U.S. Cl.
CPC .......... *B60R 16/023* (2013.01); *B60L 3/0038* (2013.01); *B60L 3/0084* (2013.01);
(Continued)

(58) Field of Classification Search
CPC .... B60R 16/023; B60L 3/0038; B60L 3/0084; B60L 15/2054; B60L 2240/12; B60L 2240/48; B60W 10/08
See application file for complete search history.

(56) References Cited

U.S. PATENT DOCUMENTS 9,672,111 B2 *   6/2017   Wataru ...................... G06F 1/06
2008/0065299 A1 *   3/2008   Brunstetter ........... F16H 59/105
  701/51
(Continued)

FOREIGN PATENT DOCUMENTS

DE   10 2019 218904 A   6/2021
JP   2005-119328 A   5/2005
(Continued)

*Primary Examiner* — Jess Whittington
*Assistant Examiner* — Terry C Buse
(74) *Attorney, Agent, or Firm* — Posz Law Group, PLC

(57) ABSTRACT

A drive device includes a driver, a determination storage, a comparator, and at least one of a control storage and a monitor storage. The control storage stores a control pattern that includes a signal instructing a conduction state of each of loads. The driver control semiconductor switches respectively corresponding to the loads according to the control pattern. The determination storage stores a determination pattern. The monitor storage stores a monitor pattern that is a result of monitoring the conduction state of each of the loads. The comparator compares the determination pattern with a comparison pattern that is at least one of the control pattern and the monitor pattern, and determine that an abnormality of the comparison pattern has occurred in response to that the determination pattern and the comparison pattern satisfy a predetermined correspondence relationship.

21 Claims, 12 Drawing Sheets

(51) Int. Cl.
  *B60L 15/20* (2006.01)
  *B60W 10/08* (2006.01)
(52) U.S. Cl.
  CPC ......... *B60L 15/2054* (2013.01); *B60W 10/08*
  (2013.01); *B60L 2240/12* (2013.01); *B60L*
  *2240/48* (2013.01)

(56) References Cited

U.S. PATENT DOCUMENTS

| | | | |
|---|---|---|---|
| 2009/0134970 A1 | 5/2009 | Iwagami et al. | |
| 2011/0276191 A1* | 11/2011 | Zushi | G05B 9/02 |
| | | | 700/293 |
| 2012/0001597 A1* | 1/2012 | Gokan | H02P 29/032 |
| | | | 322/15 |
| 2013/0055052 A1* | 2/2013 | Kaeriyama | H04B 5/22 |
| | | | 714/799 |
| 2014/0145696 A1* | 5/2014 | Hoshino | H02M 3/157 |
| | | | 323/283 |
| 2014/0239988 A1* | 8/2014 | Soma | G01R 31/31715 |
| | | | 324/750.3 |
| 2015/0191135 A1 | 7/2015 | Ben Noon et al. | |
| 2015/0191136 A1 | 7/2015 | Ben Noon et al. | |
| 2015/0191151 A1 | 7/2015 | Ben Noon et al. | |
| 2015/0195297 A1 | 7/2015 | Ben Noon et al. | |
| 2017/0046887 A1 | 2/2017 | Patino et al. | |
| 2017/0259761 A1 | 9/2017 | Ben Noon et al. | |
| 2017/0341604 A1 | 11/2017 | Ben Noon et al. | |
| 2017/0341605 A1 | 11/2017 | Ben Noon et al. | |
| 2017/0355326 A1 | 12/2017 | Ben Noon et al. | |
| 2018/0015888 A1 | 1/2018 | Ben Noon et al. | |
| 2018/0029539 A1 | 2/2018 | Ben Noon et al. | |
| 2018/0029540 A1 | 2/2018 | Ben Noon et al. | |
| 2018/0213006 A1 | 7/2018 | Wakita et al. | |
| 2019/0109456 A1* | 4/2019 | Fujiwara | H02H 7/20 |
| 2019/0111863 A1 | 4/2019 | Ben Noon et al. | |
| 2020/0044585 A1* | 2/2020 | Hatakeyama | B60L 3/0084 |
| 2020/0073786 A1 | 3/2020 | Schat et al. | |
| 2020/0139982 A1* | 5/2020 | Sakamoto | G06F 11/18 |
| 2020/0242053 A1* | 7/2020 | Imatoh | G06F 13/102 |
| 2020/0290533 A1 | 9/2020 | Durkop et al. | |
| 2022/0070186 A1* | 3/2022 | Ito | H04L 63/1408 |

FOREIGN PATENT DOCUMENTS

| | | |
|---|---|---|
| JP | 2008-140010 A | 6/2008 |
| JP | 2009-151420 A | 7/2009 |
| JP | 2018-150884 A | 9/2018 |

* cited by examiner

FIG. 2
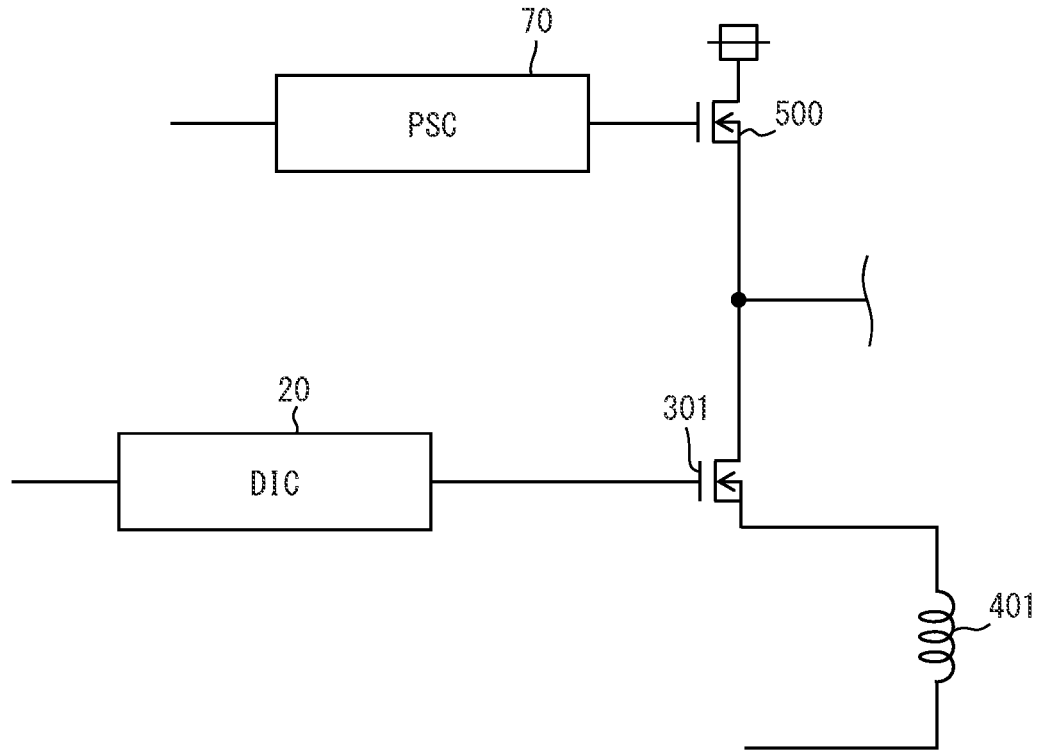
FIG. 3
| | 1ACT | 2ACT | 3ACT | 4ACT | 5ACT |
|---|---|---|---|---|---|
| 1NG | 1 | 1 | 1 | 0 | 1 |
| 2NG | 0 | 1 | 1 | 1 | 1 |
| 3NG | 1 | 1 | 1 | 1 | 0 |
| 4NG | 0 | 1 | 1 | 0 | 0 |
| 5NG | 1 | 1 | 0 | 1 | 1 |
FIG. 4
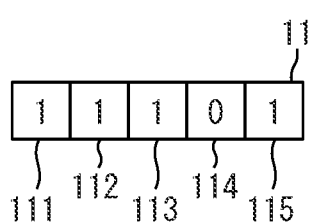

| | 1ACT | 2ACT | 3ACT | 4ACT | 5ACT |
|---|---|---|---|---|---|
| 1ST SPEED | 1 | 1 | 1 | 0 | 0 |
| 2ND SPEED | 1 | 1 | 0 | 0 | 1 |
| 3RD SPEED | 1 | 0 | 1 | 0 | 1 |
| 4TH SPEED | 0 | 1 | 1 | 1 | 0 |
| 5TH SPEED | 0 | 1 | 0 | 1 | 1 |

DRIVE CIRCUIT FOR CONTROLLING CONDUCTION STATES OF MULTIPLE LOADS

CROSS REFERENCE TO RELATED APPLICATION

The present application claims the benefit of priority from Japanese Patent Application No. 2020-147785 filed on Sep. 2, 2020. The entire disclosure of the above application is incorporated herein by reference.

TECHNICAL FIELD

The present disclosure relates to a drive device.

BACKGROUND

Conventionally, there has been known a driver circuit as a drive device. The driver circuit is mounted to an electronic control unit (ECU) together with a microcomputer.

SUMMARY

The present disclosure provides a drive device that includes a driver, a determination storage, a comparator, and at least one of a control storage and a monitor storage. The control storage stores a control pattern that includes a signal instructing a conduction state of each of loads. The driver control semiconductor switches respectively corresponding to the loads according to the control pattern. The determination storage stores a determination pattern. The monitor storage stores a monitor pattern that is a result of monitoring the conduction state of each of the loads. The comparator compares the determination pattern with a comparison pattern that is at least one of the control pattern and the monitor pattern, and determine that an abnormality of the comparison pattern has occurred in response to that the determination pattern and the comparison pattern satisfy a predetermined correspondence relationship.

BRIEF DESCRIPTION OF DRAWINGS

Objects, features and advantages of the present disclosure will become apparent from the following detailed description made with reference to the accompanying drawings. In the drawings:

FIG. 2 is a circuit diagram showing a schematic configuration of a drive IC portion according to the first embodiment;

FIG. 3 is an image diagram showing a schematic configuration of a prohibition pattern in the first embodiment;

FIG. 4 is an image diagram showing a schematic configuration of a control register according to the first embodiment;

DETAILED DESCRIPTION

Figure 1:
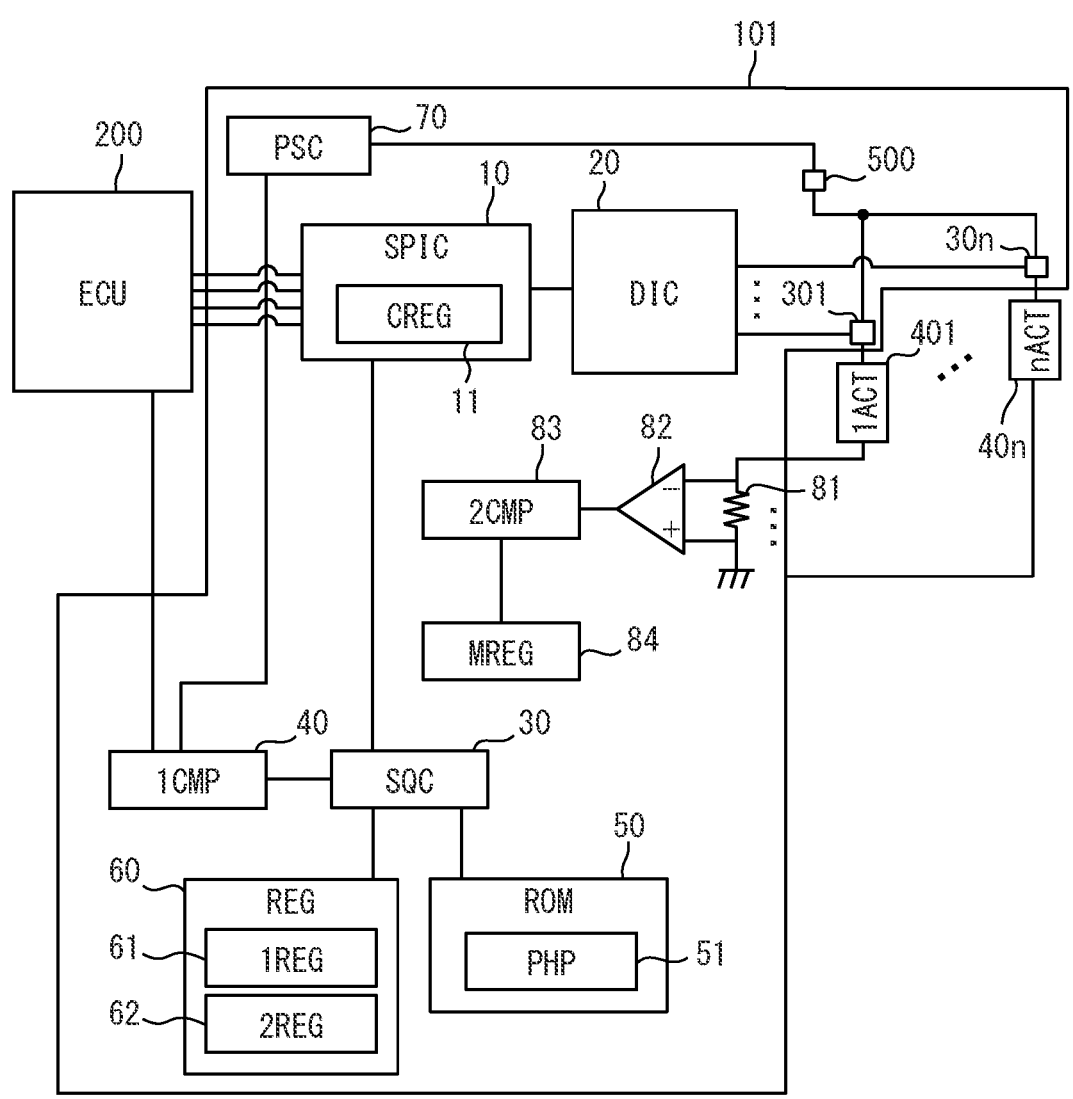
FIG. 1 is a circuit diagram showing a schematic configuration of a drive device according to a first embodiment.
Figure 5:
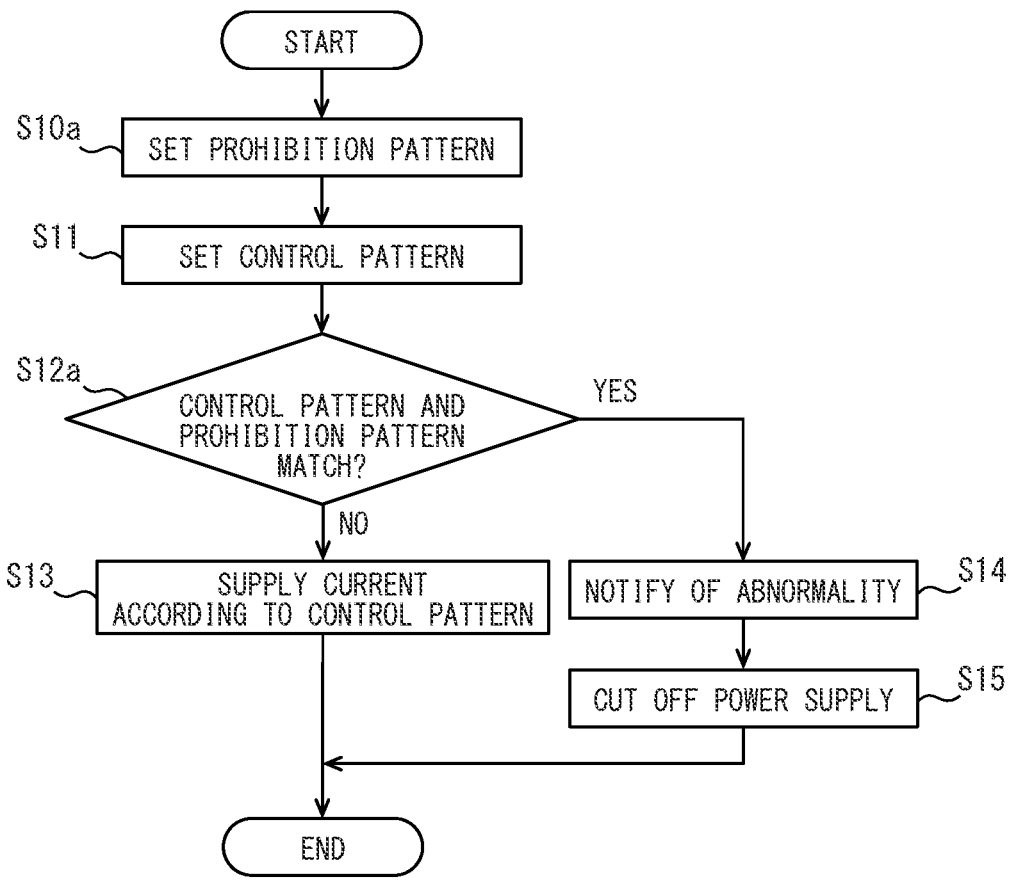
FIG. 5 is a flowchart showing the operation of the drive device according to the first embodiment.

A driver circuit as a drive device may be mounted to an ECU together with a microcomputer. The driver circuit may include a driver, a microcomputer monitoring circuit, and the like. The microcomputer monitoring circuit may input a drive permission command to the driver when the operation of the microcomputer is normal, and may input a drive prohibition command to the driver when the operation of the microcomputer is abnormal. The driver may drive a load in response to a load control signal during a period when the drive permission command is input, and may stop driving the load during a period when the drive prohibition command is input.

Although it is not a conventional technique, a drive device may include a monitor circuit for monitoring a conduction state of a load. Further, the drive device may temporarily store a load control signal and a monitor result by the monitor circuit. In such a drive device, an abnormality may occur in stored information such as the load control signal and the monitor result.

A drive device according to a first aspect of the present disclosure includes a control storage, a driver, a determination storage, and a comparator. The control storage is configured to store a control pattern that includes a signal instructing a conduction state of each of loads. The driver is configured to control of semiconductor switches according to the control pattern. The semiconductor switches correspond to the loads, respectively. The determination storage is configured to store a determination pattern for determining an abnormality of the control pattern. The determination pattern is a conduction pattern that indicates the conduction state of each of the loads. The comparator is configured to compare the determination pattern and the control pattern, and determine that the abnormality of the control pattern has occurred in response to that the determination pattern and the control pattern satisfy a predetermined correspondence relationship.

In this way, the drive device according to the first aspect stores the control pattern and the determination pattern. Then, the drive device compares the determination pattern with the control pattern to determine the abnormality of the control pattern.

A drive device according to a second aspect of the present disclosure includes a driver, a monitor storage, a determination storage, and a comparator. The driver is configured to control semiconductor switches according to a control pattern. The semiconductor switches corresponding to loads, respectively. The control pattern includes a signal instructing a conduction state of each of the loads. The monitor storage is configured to store a monitor pattern that is a result of monitoring the conduction state of each of the loads. The determination storage is configured to store a determination pattern for determining an abnormality of the monitor pattern. The determination pattern is a conduction pattern that indicates the conduction state of each of the loads. The comparator is configured to compare the determination pattern and the monitor pattern and determine that the abnormality of the monitor pattern has occurred in response to that the determination pattern and the monitor pattern satisfy a predetermination correspondence relationship.

In this way, the drive device according to the second aspect stores the monitor pattern and the determination pattern. Then, the drive device compares the determination pattern with the monitor pattern to determine the abnormality of the monitor pattern.

A drive device according to a third aspect of the present disclosure includes a control storage, a driver, a monitor storage, a determination storage, and a comparator. The control storage is configured to store a control pattern that includes a signal instructing a conduction state of each of loads. The driver is configured to control semiconductor switches according to the control pattern. The semiconductor switches correspond to the loads, respectively. The monitor storage is configured to store a monitor pattern that is a result of monitoring the conduction state of each of the of loads. The determination storage is configured to store a determination pattern for determining an abnormality of the control pattern and an abnormality of the monitor pattern. The determination pattern is a conduction pattern indicating the conduction state of each of the loads. The comparator is configured to compare the determination pattern with the control pattern and the monitor pattern, determine that the abnormality of the control pattern has occurred in response to that the determination pattern and the control pattern satisfy a predetermined correspondence relationship, and determine that the abnormality of the monitor pattern has occurred in response to that the determination pattern and the monitor pattern satisfy a predetermined correspondence relationship.

In this way, the drive device according to the third aspect stores the control pattern, the monitor pattern, and the determination pattern. Then, the drive device compares the determination pattern with the control pattern to determine the abnormality of the control pattern. Further, the drive device compares the determination pattern with the monitor pattern to determine the abnormality of the monitor pattern.

Hereinafter, multiple embodiments of the present disclosure will be described with reference to the drawings. In each embodiment, portions corresponding to those described in the preceding embodiment are denoted by the same reference numerals, and redundant descriptions will be omitted in some cases. In each embodiment, in a case where only a part of the configuration is described, another preceding embodiment can be referenced to and applied to the other parts of the configuration.

First Embodiment

A drive device 101 according to a first embodiment will be described with reference to FIGS. 1 to 8. The drive device 101 can be applied to, for example, a circuit for driving a load mounted on a vehicle. In the following, an example applied to an automatic transmission of a vehicle will be described.

<Automatic Transmission>

A schematic configuration of the automatic transmission will be described. The automatic transmission includes, for example, a valve body, a transmission mechanism, an oil pump, a parking lock mechanism, and the like. The transmission mechanism has multiple friction elements including, for example, a clutch and a brake. The transmission mechanism can change a transmission ratio in stages by selectively engaging each friction element.

A hydraulic circuit for adjusting the pressure of hydraulic oil supplied to the transmission mechanism is formed in the valve body. The valve body has multiple solenoid valves that regulate the hydraulic oil pumped from the oil pump and supply the hydraulic oil to the friction elements. The solenoid valve has a solenoid. The solenoid is sometimes referred to as a coil. The hydraulic oil is adjusted by controlling electrical conduction to the solenoid.

The solenoid valve corresponds to a load. Further, in the present embodiment, a solenoid valve is adopted as actuators 401 to 40$n$, which will be described later. Therefore, a conduction state of the load corresponds to a conduction state of the solenoid valve (solenoid). A linear solenoid valve can be used as the solenoid valve.

When a parking range is selected, the parking lock mechanism sets a parking lock to lock a rotation of an output shaft (axle) of the automatic transmission. When a shift range other than the parking range is selected from the state of the parking lock, the parking lock mechanism releases the parking lock. Accordingly, the output shaft is unlocked. However, the automatic transmission is not limited to the above configuration.

<Load Drive System>

Next, a schematic configuration of a load drive system will be described with reference to FIG. 1. FIG. 1 is a diagram showing the load drive system. In FIG. 1, conduction paths of the actuators 401 to 40$n$ (1ACT to nACT) are simplified.

The load drive system includes at least a drive device 101 and an electronic control unit (ECU) 200. The load drive system controls the conduction drive of the actuators 401 to 40$n$. Further, it can be said that the load drive system controls the automatic transmission including the valve body by conducting and driving the actuators 401 to 40$n$.

Note that n is a natural number of 2 or more. In the present embodiment, n=5 is adopted as an example. Therefore, the present embodiment adopts an example in which the first actuator 401 to the fifth actuator 405 are conducted and driven. Further, the present embodiment adopts an example in which the automatic transmission is switched among a first speed to a fifth speed by controlling the drive of the first actuator 401 to the fifth actuator 405. The actuators 401 to 405 are also referred to as actuators 40$n$ when it is not necessary to distinguish them from each other.

However, the present disclosure is not limited to the above example. The present disclosure can also adopt an example in which the automatic transmission is switched among the first speed to an eighth speed by controlling the drive of multiple actuators 40$n$. Further, the present disclosure can also adopt an example in which the automatic transmission is switched among a P range, an R range, an N range, and a D range by controlling the drive of multiple actuators 40$n$. Further, as the actuators 40$n$, an on-off solenoid valves can also be adopted.

The ECU 200 includes a microcomputer having at least one central processing unit (CPU), at least one storage, and the like. Further, various sensors, other ECUs, and the like are connected to the ECU 200. The storage stores programs, data, and the like. The data includes a data stored in advance, a sensor signal output from the sensor, and the like.

In the ECU 200, the CPU executes a program. By executing the program, the CPU performs various arithmetic processes while using the data. The ECU 200 outputs a load control signal and the like as results of arithmetic processes.

In the load drive system, the drive device 101 is arranged on the valve body. That is, the drive device 101 has an integrated mechanical and electrical structure with the automatic transmission. The ECU 200 is mechanically separated from the automatic transmission.

The ECU 200 and the drive device 101 are connected by a copper wire or the like. In the present embodiment, the ECU 200 and the drive device 101 transmit and receive data by serial peripheral interface (SPI) communication. The ECU 200 transmits a load control signal or the like to the drive device 101. When the drive device 101 receives the load control signal, the drive device 101 operates in response to the load control signal. The configuration and the operation of the drive device 101 will be described in detail later.

As shown in FIGS. 1 and 2, the load drive system includes multiple drive switches 301 to 30*n*. The drive switches 301 to 30*n* are respectively provided on the conduction paths of the actuators 40*n*. Therefore, the present embodiment adopts an example in which the first drive switch 301 to the fifth drive switch 305 are provided. The drive switches 301 to 305 are also referred to as a drive switch 30*n* when it is not necessary to distinguish them from each other. The drive switch 30*n* is provided in the drive device 101.

When the drive switch 30*n* is turned on, an electric current is supplied to the corresponding actuator 40*n*. When the drive switch 30*n* is turned off, the supply of the electric current to the corresponding actuator 40*n* is cut off. In other words, each actuator 40*n* is conducted when the corresponding drive switch 30*n* is turned on. Further, each actuator 40*n* is not conducted when the corresponding drive switch 30*n* is turned off.

As shown in FIGS. 1 and 2, the load drive system includes a power supply switch 500. In addition, the load drive system includes various sensors. However, the load drive system does not have to include the power supply switch 500 and the sensors, and the power supply switch 500 and the sensors may be arranged outside the load drive system.

The power supply switch 500 is provided on a conduction path to the actuators 40*n*. As the power supply switch 500, a semiconductor switch such as a metal-oxide silicon field-effect transistor (MOSFET) can be adopted. A single (common) power supply switch 500 is provided for the actuators 401 to 405. When the power supply switch 500 is turned on, each of the actuators 40*n* can be supplied with electric current. When the power supply switch 500 is turned off, the supply of the electric current to each of the actuators 40*n* is cut off. The power supply switch 500 may be arranged on a high-side, that is, a power-supply side, or may be arranged on a low-side, that is, a ground (GND) side with respect to the actuators 40*n*. The power supply switch 500 of the present embodiment is arranged on the high side. The power supply switch 500 is provided in the drive device 101.

The sensor detects a state of the load. The sensor detects a state of the automatic transmission, including the valve body. Examples of the sensor include a hydraulic sensor, a rotation sensor, an oil temperature sensor, a parking lock sensor, and the like. The hydraulic sensor detects the pressure of hydraulic fluid in the hydraulic circuit. The rotation sensor detects the rotation speed of the automatic transmission. The rotation sensor includes, for example, a sensor that detects the rotation speed on the input side of the automatic transmission and a sensor that detects the rotation speed on the output side of the automatic transmission. The oil temperature sensor detects the temperature of hydraulic oil in the hydraulic circuit. The parking lock sensor detects the state of the parking lock mechanism.

<Configuration of Drive Device>

The drive device 101 will be described with reference to FIGS. 1, 2 to 4, and 6. In FIG. 2, for convenience, only a portion corresponding to one actuator 401 is shown.

The drive device 101 is a circuit for conducting and driving the actuators 401 to 405. Further, the drive device 101 conducts and drives the actuators 401 to 405 by controlling the drive switches 301 to 305. Unlike the ECU 200, the drive device 101 does not include a microcomputer. That is, the drive device 101 electrically conducts and drives the actuators 401 to 405 by hardware logic. Each of the first drive switch 301 to the fifth drive switch 305 corresponds to a semiconductor switch.

The drive device 101 mainly includes an SPI circuit (SPIC) 10 including a control register 11, a drive IC (DIC) 20, a first comparator (1CMP) 40, and a read-only memory (ROM) 50. Further, the drive device 101 includes a sequence circuit (SQC) 30, a register unit (REG) 60, a power supply circuit (PSC) 70, a current detection resistor 81, an amplifier 82, a second comparator (2CMP) 83, a monitor register (MREG) 84, and the like. Further, the drive device 101 includes the drive switches 30*n* and the power supply switch 500.

The SPI circuit 10 is a circuit that is connected to the ECU 200 and performs serial communication with the ECU 200. Further, the SPI circuit 10 is connected to the drive IC 20, the sequence circuit 30, and the like. The SPI circuit 10 has a conversion circuit that converts a received serial data into a parallel data. Further, the SPI circuit 10 has a control register (CREG) 11. The control register 11 corresponds to a control storage.

Examples of the serial data transmitted from the ECU 200 include a load control signal for conducting and driving the actuators 401 to 405. The load control signal includes a signal (value) instructing a conduction state of each of the actuators 401 to 405. That is, it can be said that the load control signal includes a signal indicating the conduction state individually corresponding to each of the actuators 401 to 405.

The load control signal includes, for example, 1 as a signal instructing conducting and 0 as a signal instructing non-conducting. Therefore, the load control signal can be represented by 0 and 1. In the present embodiment, a 5-bit load control signal is adopted as an example. However, the present disclosure is not limited to this example, and any multi-bit load control signal can be adopted.

As shown in FIG. 4, the load control signal is converted into parallel data and stored in the control register 11. The load control signal converted into parallel data can be regarded as a control pattern. Therefore, the load control signal corresponds to the control pattern. The control register 11 has bits 111 to 115 of addresses corresponding to the actuators 401 to 405. In the control register 11, the signal indicating the conduction state of each of the actuators 401 to 405 in the load control signal is written in the bit of each address.

The first bit 111 corresponds to the first actuator 401. The second bit 112 corresponds to the second actuator 402. The third bit 113 corresponds to the third actuator 403. The fourth bit 114 corresponds to the fourth actuator 404. The fifth bit 115 corresponds to the fifth actuator 405.

FIG. 4 shows an example in which 11101 is written as the control pattern in the control register 11. Further, this control pattern shows a state in which the fifth bit 115 is garbled. That is, originally, 11100 should be written as the control pattern in the control register 11. However, in the control register 11, 11101 is written as the control pattern due to an internal abnormality of the drive device 101.

The control pattern is compared with a determination pattern. Therefore, the control pattern can be said to be a comparison pattern. The control pattern stored in the control register 11 corresponds to the load control signal of the present time. Therefore, the control pattern can be said to be the present time value.

The present embodiment adopts an example in which the load control signal is acquired in the SPI circuit 10. However, the present disclosure is not limited to this example, and the load control signal may be acquired by a communication circuit conforming to a controller area network (CAN) protocol. In this case, the drive device 101 is connected to the ECU 200 by a communication bus. The drive device 101 acquires the load control signal included in a message received by CAN communication. In the control register 11, a signal indicating the conduction state in the load control signal is written.

Further, in the present disclosure, load control signals may be acquired depending on the level of multiple terminals. In this case, the drive device 101 is connected to the ECU 200 by multiple copper wires. The drive device 101 is connected to the ECU 200 via the copper wires more than the number of signals indicating the conduction state in the load control signal. The drive device 101 includes terminals to which the copper wires are individually connected. Then, the drive device 101 acquires the level (Hi, Low) of each terminal as the load control signal. A signal corresponding to the level of each terminal is written in the control register 11.

As shown in FIGS. 1 and 2, the drive IC 20 is connected to the drive switches 301 to 305. The drive IC 20 controls the drive switches 301 to 305 according to the control pattern. That is, the drive IC 20 outputs drive signals for turning on or off the drive switches 301 to 305 according to the control pattern stored in the control register 11. Further, the drive IC 20 selectively turns on or off the drive switches 301 to 305 according to the control pattern stored in the control register 11. The drive IC 20 corresponds to a driver.

As the drive signal, a pulse width modulation (PWM) signal can be adopted. In this case, the drive IC 20 can change electric currents flowing through the actuators 40n (that is, conduction currents) by changing the duty ratio of the PWM signal.

For example, when the control pattern is 11100, the drive IC 20 turns on the first drive switch 301 to the third drive switch 303. As a result, the drive IC 20 causes the first actuator 401 to the third actuator 403 to be in a conducting state. At this time, the drive IC 20 turns off the fourth drive switch 304 and the fifth drive switch 305. As a result, the drive IC 20 causes the fourth actuator 404 and the fifth actuator 405 to be in a non-conducting state.

Figure 6:
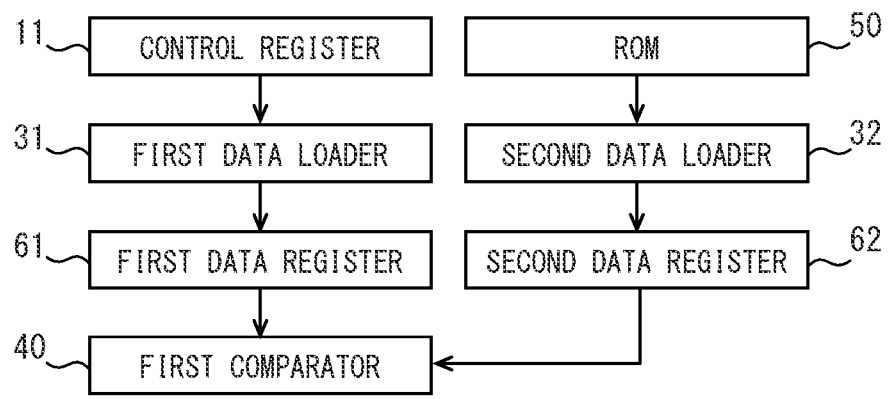
FIG. 6 is a block diagram showing the operation of a sequence circuit according to the first embodiment.

As shown in FIG. 6, the sequence circuit 30 includes a first data loader 31, a second data loader 32, and the like. Further, the sequence circuit 30 includes multiple switching elements and the like. The sequence circuit 30 operates in synchronization with a clock.

Figure 8:
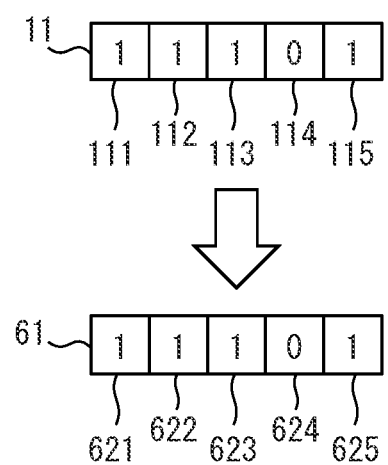
FIG. 8 is an image diagram showing a setting operation of a control pattern according to the first embodiment.

The first data loader 31 writes the control pattern stored in the control register 11 to a first data register (1REG) 61. That is, as shown in FIG. 8, the first data loader 31 loads the signals of bits 111 to 115 in the control register 11 and writes the signals to bits 621 to 625 of the first data register 61, respectively.

Figure 7:
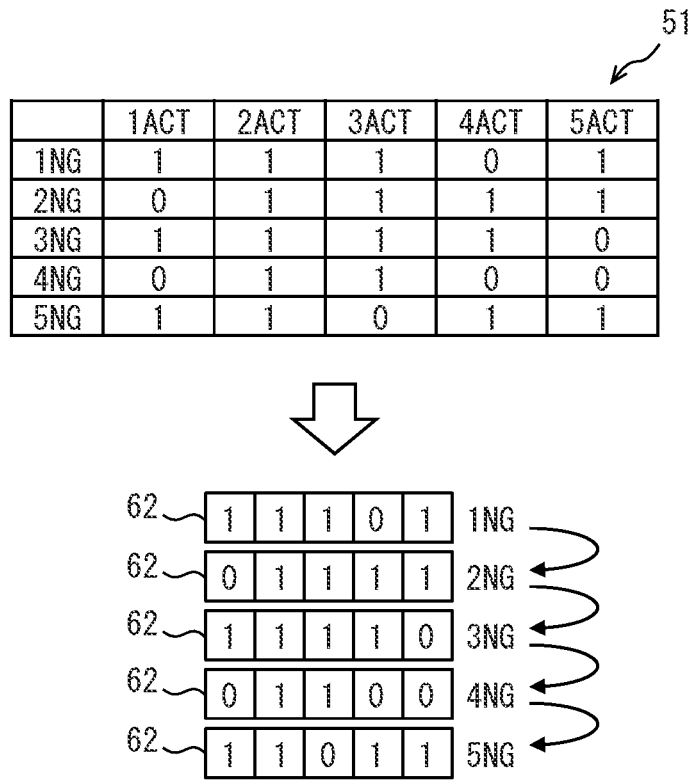
FIG. 7 is an image diagram showing a setting operation of the prohibition pattern in the first embodiment.

On the other hand, the second data loader 32 writes a prohibition pattern (PHP) 51 stored in the ROM 50 to a second data register (2REG) 62. That is, as shown in FIG. 7, the second data loader 32 loads the signals of bits in the prohibition pattern 51 and writes the signals to bits of the second data register 62.

The first comparator 40 includes a comparator. The first comparator 40 compares the determination pattern, which will be described later, with the control pattern. The first comparator 40 compares each signal of the determination pattern and each signal of the control pattern in order. The first comparator 40 compares the determination pattern and the control pattern, and determines whether or not the determination pattern and the control pattern satisfy a predetermined correspondence relationship. The first comparator 40 corresponds to a comparator.

In the present embodiment, the prohibition pattern 51 is adopted as the determination pattern. Therefore, the predetermined correspondence relationship in the present embodiment indicates that the prohibition pattern 51 and the control pattern match. That is, when the prohibition pattern 51 and the control pattern match, the first comparator 40 determines that the predetermined correspondence relationship is satisfied. On the other hand, the first comparator 40 determines that the predetermined correspondence relationship is not satisfied when the prohibition pattern 51 and the control pattern differ.

The control pattern that matches the prohibition pattern 51 is a prohibited conduction pattern. Therefore, this control pattern is an abnormal conduction pattern in which a garbled bit or the like has occurred. On the other hand, the control pattern that differs from the prohibition pattern 51 is not a prohibited conduction pattern. Therefore, this control pattern is a normal conduction pattern in which no garbled bit or the like has occurred.

Therefore, the first comparator 40 determines that the control pattern is abnormal in response to that the prohibition pattern 51 and the control pattern match. On the other hand, the first comparator 40 determines that the control pattern is normal in response to the prohibition pattern 51 and the control pattern differ.

The output signals of the first comparator 40 are different depending on whether or not the prohibition pattern 51 and the control pattern match. If they match, the first comparator 40 outputs an abnormal signal indicating that the control pattern is abnormal. If they differ, the first comparator 40 outputs a normal signal indicating that the control pattern is normal. The abnormal signal is output to at least one of the power supply circuit 70 and the ECU 200. At least one of the power supply circuit 70 and the ECU 200 means the power supply circuit 70, the ECU 200, or both the power supply circuit 70 and the ECU 200.

It can be said that the first comparator 40 outputs the abnormal signal to the power supply circuit 70 to cut off the power supply to the actuator 40n. On the other hand, it can be said that the first comparator 40 outputs the abnormal signal to the ECU 200 to notify the ECU 200 of the abnormality.

The ROM 50 stores the prohibition pattern 51. The prohibition pattern 51 is a conduction pattern indicating a conduction state of each of the actuators 40n. Further, the prohibition pattern 51 is one of the determination patterns for determining the abnormality of the control pattern. That is, the ROM 50 stores the prohibition pattern 51 as the determination pattern. The ROM 50 corresponds to a determination storage.

The prohibition pattern 51 is a conduction pattern that is prohibited as a conduction state of the actuators 40*n*. The prohibition pattern 51 is a conduction pattern that causes an unfavorable operation as the automatic transmission. Therefore, the prohibition pattern 51 is stored in the ROM 50 in advance, unlike the control pattern and the like.

FIG. 3 is an example of the prohibition pattern 51. In the present embodiment, five prohibition patterns 51 are adopted. In FIG. 3, the first actuator 401 is shown as 1 ACT, the second actuator 402 is shown as 2 ACT, the third actuator 403 is shown as 3 ACT, the fourth actuator 404 is shown as 4 ACT, and the fifth actuator 405 is shown as 5 ACT.

The ROM 50 has bits of addresses respectively corresponding to the actuators 401 to 405. In the ROM 50, signals (values) indicating the conduction states of the actuators 401 to 405 in the prohibition pattern 51 are written in the bits of addresses. The present embodiment adopts a 5-bit control pattern as an example. Therefore, each of the prohibition patterns 51 has 5 bits, which is the same as the control pattern. Each prohibition pattern 51 includes 1 as a signal indicating conducting and 0 as a signal indicating non-conducting. Therefore, each of the prohibition patterns 51 can be represented by 0 and 1.

The first prohibition pattern 51 (1NG) is 11101. The second prohibition pattern 51 (2NG) is 01111. The third prohibition pattern 51 (3NG) is 11110. The fourth prohibition pattern 51 (4NG) is 01100. The fifth prohibition pattern 51 (5NG) is 11011. The ROM 50 may store at least one prohibition pattern 51.

The register unit 60 (REG) includes the first data register 61 and the second data register 62. In the first data register 61 and the second data register 62, the conduction patterns to be compared by the first comparator 40 are set by the sequence circuit 30. In the first data register 61, the control pattern is set. In the second data register 62, the determination pattern (prohibition pattern) is set.

As shown in FIGS. 1 and 2, the power supply circuit 70 is a circuit for switching on or off of the power supply switch 500. For example, when the abnormal signal is input from the first comparator 40, the power supply circuit 70 outputs a signal indicating that the power supply switch 500 is to be turned off. That is, when an abnormality of the control pattern has occurred, the power supply circuit 70 turns off the power supply switch 500 and cuts off the supply of the electric current to each of the actuators 40*n*. Further, it can be said that the power supply circuit 70 turns off the power supply switch 500 in order to prevent each of the actuators 40*n* from being driven by the abnormal control pattern. The abnormal signal can also be said to be a signal instructing the power supply switch 500 to be turned off.

The current detection resistor 81 constitutes a current detection unit together with the amplifier 82. The current detection unit is individually provided for each of the actuators 40*n*. Therefore, in the present embodiment, the drive device 101 is provided with five current detection units. In FIG. 1, as a representative example, only the current detection unit corresponding to the first actuator 401 is shown.

Each of the current detection units detects the electric current actually flowing through the corresponding actuator 40*n* (solenoid). In other words, each of the current detection units detects the conduction state of the corresponding actuator 40*n*. Further, it can be said that each of the current detection units monitors the conduction state of the corresponding actuator 40*n*.

In addition to the current detection resistor 81 and the amplifier 82, each of the current detection units may include a filter that removes noise of a voltage amplified by the amplifier 82. The filter can include, for example, a resistor and a capacitor.

The current detection resistor 81 is connected in series with the actuator 401. The current detection resistor 81 is provided on the ground side (downstream side) with respect to the first actuator 401. The amplifier 82 amplifies a voltage generated across the current detection resistor 81 and proportional to the electric current. Therefore, the amplifier 82 outputs a voltage signal proportional to the electric current flowing through the first actuator 401. Therefore, each of the current detection units outputs a voltage signal proportional to the electric current flowing through the corresponding actuator 40*n*.

The second comparator 83 includes a comparator. The second comparator 83 is individually provided for each of the actuators 40*n*. Further, the second comparator 83 is provided as a set with the current detection resistor 81 and the amplifier 82. In the present embodiment, five second comparators 83 are provided in the drive device 101. In FIG. 1, as a representative example, only the second comparator 83 corresponding to the first actuator 401 is shown.

The second comparator 83 compares the voltage signal output by the amplifier 82 with a reference value. The second comparator 83 outputs a positive value when the voltage signal is higher than the reference value, and outputs a negative value when the voltage signal is lower than the reference value. As the reference value, for example, a voltage value assuming a current value at which a clutch engages can be used.

That is, it can be said that the second comparator 83 outputs a monitor result indicating the conduction state of each of the actuators 40*n* monitored by each of the current detection units. The second comparator 83 outputs a positive value, for example, when the first actuator 401 is conducting. Further, the second comparator 83 outputs a negative value, for example, when the first actuator 401 is not conducting.

The output of each second comparator 83 is written to the monitor register 84. That is, it can be said that the monitor register 84 stores a monitor pattern that is the result of monitoring the conduction state of each of the actuators 40*n*. The monitor register 84 corresponds to a monitor storage.

The monitor register 84 has bits of addresses corresponding to the actuators 401 to 405. In the monitor register 84, a signal (value) indicating the conduction state of each of the actuators 401 to 405 is written in the bit of each of the addresses. The signal indicating the conduction state of each of the actuators 401 to 405 is the output of each of the second comparators 83.

In the monitor register 84, for example, 1 is written as a signal indicating conducting and 0 is written as a signal indicating non-conducting. Therefore, the monitor pattern can be represented by 0 and 1. The present embodiment adopts a 5-bit control pattern as an example. Therefore, the monitor pattern has 5 bits, which is the same as the control pattern.

The first bit of the monitor register 84 corresponds to the first actuator 401. The second bit corresponds to the second actuator 402. The third bit corresponds to the third actuator 403. The fourth bit corresponds to the fourth actuator 404. The fifth bit corresponds to the fifth actuator 405.

The monitor pattern is the result of monitoring the conduction state of each of the actuators 40n. Therefore, the monitor pattern and the control pattern are the same pattern when there is no abnormality. For example, when the control pattern is 11100, the monitor pattern is 11100. However, when at least one of the monitor pattern and the control pattern is abnormal, the monitor pattern and the control pattern become different patterns.

The abnormality here includes the above-mentioned garbled bit, a ground fault in the current path between the current detection resistor 81 and each of the actuators 40n, and the like. These can be regarded as internal abnormalities of the drive device 101. The drive device 101 does not have to include the current detection unit, the second comparator 83, and the monitor register 84. For example, when the control pattern is 11100 and a ground fault occurs in the current path between the current detection resistor 81 and the first actuator 401, the monitor pattern becomes 01100.

<Operation of Drive Device>

The operation of the drive device 101 will be described with reference to FIGS. 5 to 8. When receiving the load drive signal, the drive device 101 starts the operation shown in the flowchart of FIG. 5. At this time, it is assumed that the power supply circuit 70 outputs a signal indicating that the power supply switch 500 is on. That is, each of the actuators 40n is supplied with an electric current.

In S10a, the prohibition pattern 51 is set. As shown in FIGS. 6 and 7, the sequence circuit 30 sets the prohibition pattern 51 stored in the ROM 50 in the second data register 62. More specifically, the second data loader 32 loads the prohibition pattern 51 from the ROM 50. Then, the second data loader 32 sets the loaded prohibition pattern 51 in the second data register 62. When the prohibition pattern 51 is set in the second data register 62, the prohibition pattern 51 is output to the first comparator 40.

When multiple prohibition patterns 51 are stored in the ROM 50, the second data loader 32 writes the prohibition patterns 51 stored in the ROM 50 to the second data register 62 in order. Further, when the prohibition pattern 51 written in the second data register 62 is output to the first comparator 40, the second data loader 32 writes the next prohibition pattern 51 to the second data register 62.

In S11, the control pattern is set. As shown in FIGS. 6 and 8, the first data loader 31 loads the control pattern from the control register 11. Then, the first data loader 31 sets the loaded control pattern in the first data register 61. When the control pattern is set in the first data register 61, the control pattern is output to the first comparator 40.

In S12a, the control pattern and the prohibition pattern are compared. The first comparator 40 compares the control pattern set in the first data register 61 with the prohibition pattern 51 set in the second data register 62. When multiple prohibition patterns 51 are stored in the ROM 50, the first comparator 40 compares the control pattern with each of the prohibition patterns 51 in order. As a result, the first comparator 40 compares the control pattern with all the prohibition patterns 51.

The first comparator 40 proceeds to S13 when the control pattern differs from all the prohibition patterns 51. In this case, the control pattern can be regarded as normal. On the other hand, when the control pattern matches one of the prohibition patterns 51, the first comparator 40 proceeds to S14. That is, when even one of the prohibition patterns 51 matches the control pattern, the first comparator 40 proceeds to S14. In this case, the control pattern can be regarded as abnormal. In the present embodiment, an example in which the control pattern is 11101 is adopted. This control pattern matches the first prohibition pattern 51. Therefore, the first comparator 40 determines that the control pattern and the prohibition pattern 51 match.

In S13, the power supply is performed according to the control pattern. The first comparator 40 outputs the normal signal indicating that the control pattern is normal. When the normal signal is input, the drive IC 20 supply the electric current to the actuators 40n according to the control pattern. That is, the drive IC 20 selectively turns the drive switches 301 to 305 on or off according to the control pattern stored in the control register 11. As a result, the drive IC 20 selectively supply the electric current to the actuators 40n.

In S14, the abnormality is notified. The first comparator 40 outputs the abnormal signal indicating that the control pattern is abnormal to the ECU 200. As a result, the first comparator 40 notifies the ECU 200 of the abnormality.

In S15, the power supply is cut off. The first comparator 40 outputs the abnormal signal indicating that the control pattern is abnormal to the power supply circuit 70. It can be said that the first comparator 40 outputs the abnormal signal to the power supply circuit 70 to cut off the power supply to the actuators 40n. When the abnormal signal is input, the power supply circuit 70 turns off the power supply switch 500 to cut off the supply of electric current to each of the actuators 40n. Accordingly, the drive device 101 can prevent the actuators 40n from being driven by the abnormal control pattern.

It should be noted that the drive device 101 according to the present disclosure have to perform at least one of S14 and S15.

<Effects>

In this way, the drive device 101 stores the control pattern and the prohibition patterns 51. Then, the drive device 101 can determine the abnormality of the control pattern by comparing the prohibition patterns 51 with the control pattern. Further, the drive device 101 can determine the abnormality of the control pattern only by comparing the prohibition pattern 51 with the control pattern without using a microcomputer. Therefore, the drive device 101 can determine an abnormality of the control pattern with a simple configuration.

As the determination pattern for determining an abnormality of the control pattern, conduction patterns (permission patterns) permitted as conduction states of the actuators 40n can also be adopted. However, the drive device 101 stores the prohibition patterns 51 in the ROM 50 as the determination pattern. The number of the prohibition patterns 51 is smaller than the number of the permission patterns. Therefore, the drive device 101 can reduce the capacity occupied by the determination patterns in the ROM 50.

Unlike the ECU 200, the drive device 101 does not include a microcomputer. Therefore, the drive device 101 can be made smaller than a configuration including a microcomputer. In addition, the drive device 101 can reduce power consumption and heat generation as compared with the configuration including the microcomputer. As a result, the drive device 101 can have less restrictions on mountability associated with the size and heat generation than the configuration including the microcomputer. That is, the drive device 101 can have a higher degree of freedom in mounting than the configuration including the microcomputer. Further, the drive device 101 can reduce measures for functional safety and security as compared with the configuration including the microcomputer. The drive device 101 can be arranged in the immediate vicinity of the actuators 40n, so that the wire harness can be reduced and the mountability can be improved.

A preferable embodiment of the present disclosure is described above. However, the present disclosure is not limited to the above-described embodiment in any manner, and various modifications are possible within a scope that does not depart from the gist of the present disclosure. Second to sixth embodiments will be described below as other embodiments of the present disclosure. The second to sixth embodiments can be carried out individually, but can also be carried out in combination as appropriate. The present disclosure can be performed by various combinations without being limited to the combination described in the embodiments.

Second Embodiment

A drive device 102 according to a second embodiment will be described with reference to FIGS. 9, 10 and 11. The drive device 102 has a different determination pattern from the drive device 101. In the drive device 102, the same reference numerals are assigned to the same configuration as the drive device 101. Further, in the flowchart of FIG. 11, the same step number is assigned to the same process as that of the flowchart of FIG. 5.

Figure 9:
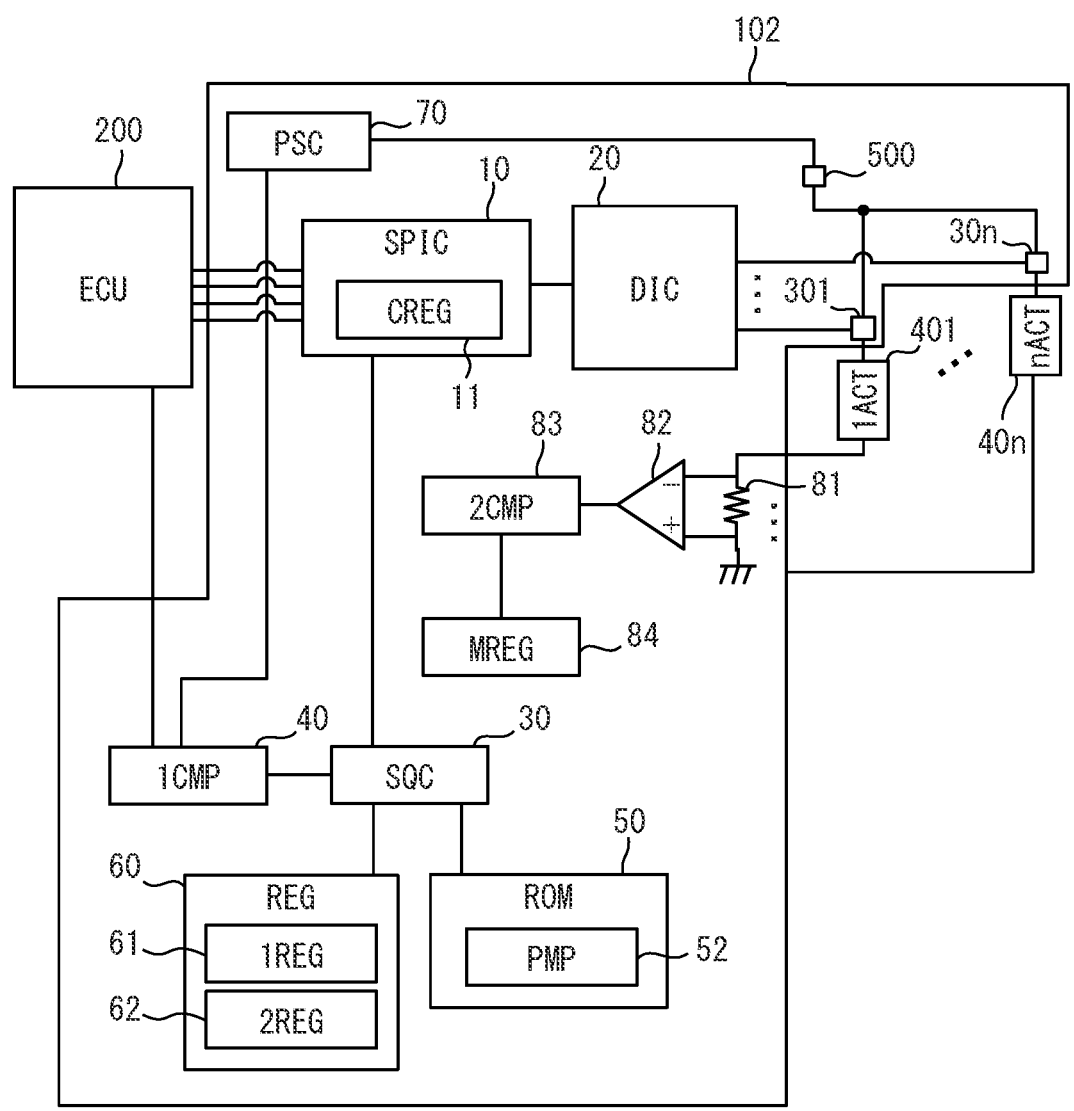
FIG. 9 is a circuit diagram showing a schematic configuration of a drive device according to a second embodiment.

As shown in FIG. 9, the drive device 102 stores a permission pattern (PMP) 52 in the ROM 50. The permission pattern 52 is a conduction pattern indicating a conduction state of each of the actuators 40n. Further, the permission pattern 52 is one of the determination patterns for determining the abnormality of the control pattern. That is, the ROM 50 stores the permission pattern 52 as the determination pattern. The ROM 50 corresponds to the determination storage.

The permission pattern 52 is a conduction pattern that is permitted as a conduction state of each of the actuators 40n. More specifically, the permission pattern 52 is a conduction pattern in which the operation is permitted as the automatic transmission. Therefore, the permission pattern 52 is stored in the ROM 50 in advance, unlike the control pattern and the like.

Figures 10, 11:
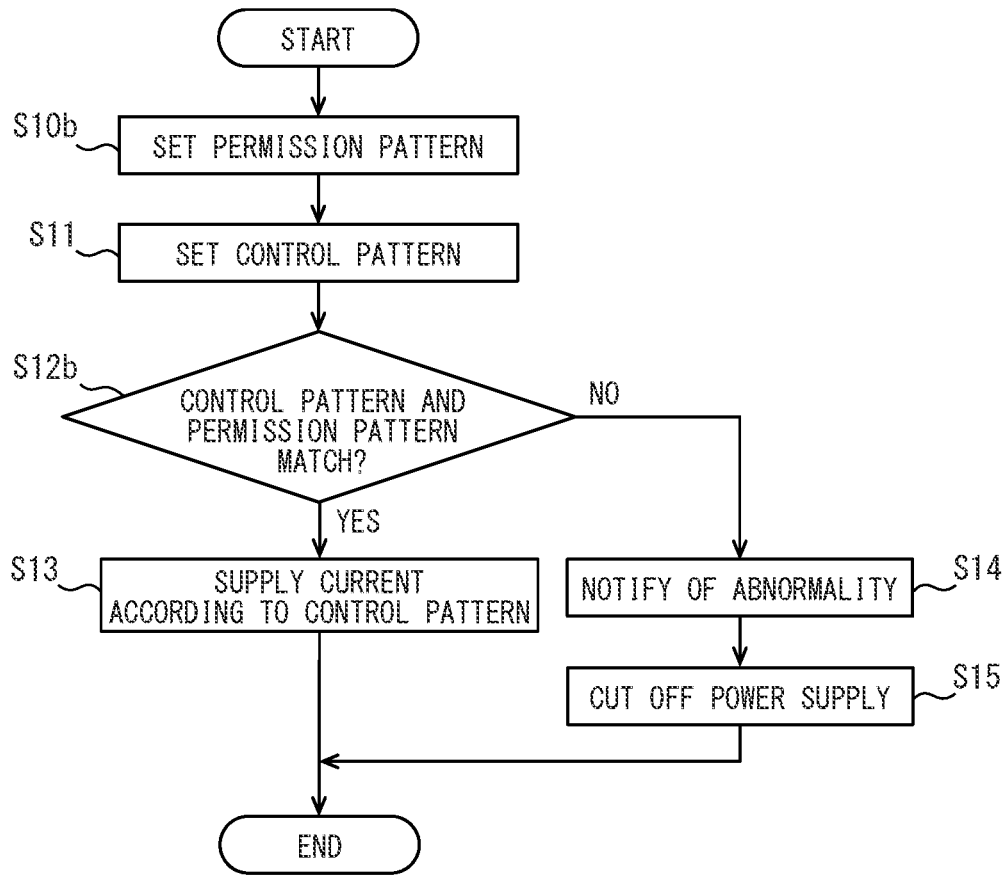
FIG. 10 is an image diagram showing a schematic configuration of a permission pattern in the second embodiment.
FIG. 11 is a flowchart showing the operation of the drive device according to the second embodiment.

FIG. 10 is an example of the permission pattern 52. In the present embodiment, five permission patterns 52 are adopted. The ROM 50 has bits of addresses respectively corresponding to the actuators 401 to 405. In the ROM 50, signals (values) indicating the conduction states of the actuators 401 to 405 in the permission pattern 52 are written in the bits of addresses. The present embodiment adopts a 5-bit control pattern as an example. Therefore, each of the permission patterns 52 has 5 bits, which is the same as the control pattern. Each of the permission patterns 52 includes 1 as a signal indicating conducting and 0 as a signal indicating non-conducting. Therefore, each permission pattern 52 can be represented by 0 and 1.

A first permission pattern 52 (1ST SPEED) is 11100. A second permission pattern 52 (2ND SPEED) is 11001. A third permission pattern 52 (3RD SPEED) is 10101. A fourth permission pattern 52 (4TH SPEED) is 01110. A fifth permission pattern 52 (5TH SPEED) is 01011.

The first comparator 40 compares each signal of the permission pattern 52 and each signal of the control pattern in order. The first comparator 40 compares the permission pattern 52 with the control pattern, and determines whether or not the permission pattern 52 and the control pattern satisfy a predetermined correspondence relationship. The first comparator 40 corresponds to a comparator.

In the present embodiment, the permission pattern 52 is adopted as the determination pattern. Therefore, the predetermined correspondence relationship in the present embodiment indicates that the permission pattern 52 and the control pattern differ. That is, the first comparator 40 determines that the predetermined correspondence is satisfied when the permission pattern 52 and the control pattern differ. On the other hand, when the permission pattern 52 and the control pattern match, the first comparator 40 determines that the predetermined correspondence is not satisfied.

The control pattern that differs from the permission pattern 52 is a conduction pattern that is not permitted. Therefore, this control pattern is an abnormal conduction pattern in which garbled bits or the like occur. On the other hand, the control pattern that matches the permission pattern 52 is a conduction pattern that is permitted. Therefore, this control pattern is a normal conduction pattern in which no garbled bits or the like occur.

Therefore, the first comparator 40 determines that the control pattern is abnormal when the permission pattern 52 and the control pattern differ. When the permission pattern 52 and the control pattern match, the first comparator 40 determines that the control pattern is normal.

The operation of the drive device 102 will be described with reference to FIG. 11. When receiving the load drive signal, the drive device 102 starts the operation shown in the flowchart of FIG. 11. At this time, it is assumed that the power supply circuit 70 outputs a signal indicating that the power supply switch 500 is on. That is, each of the actuators 40n is supplied with an electric current.

In S10b, the permission pattern is set. The sequence circuit 30 sets the permission pattern 52 stored in the ROM 50 in the second data register 62. More specifically, the second data loader 32 loads the permission pattern 52 from the ROM 50. Then, the second data loader 32 sets the loaded permission pattern 52 in the second data register 62. When the permission pattern 52 is set in the second data register 62, the permission pattern 52 is output to the first comparator 40.

When multiple permission patterns 52 are stored in the ROM 50, the second data loader 32 writes the permission patterns 52 stored in the ROM 50 to the second data register 62 in order. Further, when the permission pattern 52 written in the second data register 62 is output to the first comparator 40, the second data loader 32 writes the next permission pattern 52 to the second data register 62.

In S12a, the control pattern and the permission pattern are compared. The first comparator 40 compares the control pattern set in the first data register 61 with the permission pattern 52 set in the second data register 62. When multiple permission patterns 52 are stored in the ROM 50, the first comparator 40 compares the control pattern with each of the permission patterns 52 in order. As a result, the first comparator 40 compares the control pattern with all the permission patterns 52.

When the control pattern matches one of the permission patterns 52, the first comparator 40 proceeds to S13. That is, when even one of the permission patterns 52 matches the control pattern, the first comparator 40 proceeds to S13. In this case, the control pattern can be regarded as normal. On the other hand, when the control pattern differs from all the permission patterns 52, the first comparator 40 proceeds to S14. In this case, the control pattern can be regarded as abnormal.

The drive device 102 can determine an abnormality of the control pattern with a simple configuration in a manner similar to the drive device 101. Further, the drive device 102 can improve the degree of freedom of mounting in a manner similar to the drive device 101. Further, the drive device 102 can reduce measures for functional safety and security in a manner similar to the drive device 101.

Third Embodiment

A drive device 103 according to a third embodiment will be described with reference to FIGS. 12 and 13. The drive device 103 has a different comparison pattern from the drive device 101. In the drive device 103, the same reference numerals are assigned to the same configuration as the drive device 101. Further, in the flowchart of FIG. 13, the same step number is assigned to the same process as that of the flowchart of FIG. 5.

The drive device 103 compares the monitor pattern with the determination pattern. Therefore, the monitor pattern can be said to be the comparison pattern. The monitor pattern is stored in the monitor register 84 as with the drive device 101.

Figure 12:
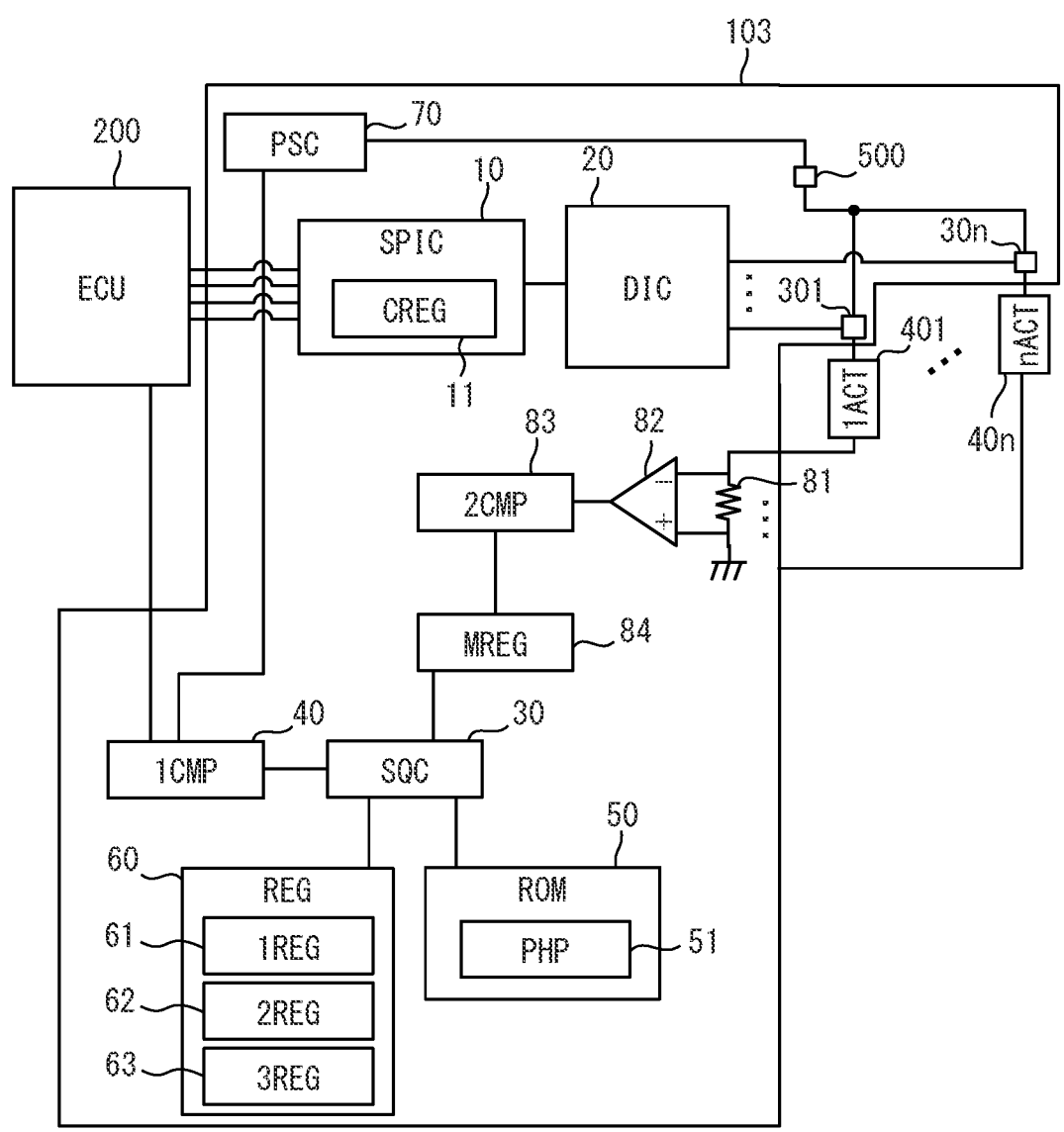
FIG. 12 is a circuit diagram showing a schematic configuration of a drive device according to a third embodiment.
Figure 13:
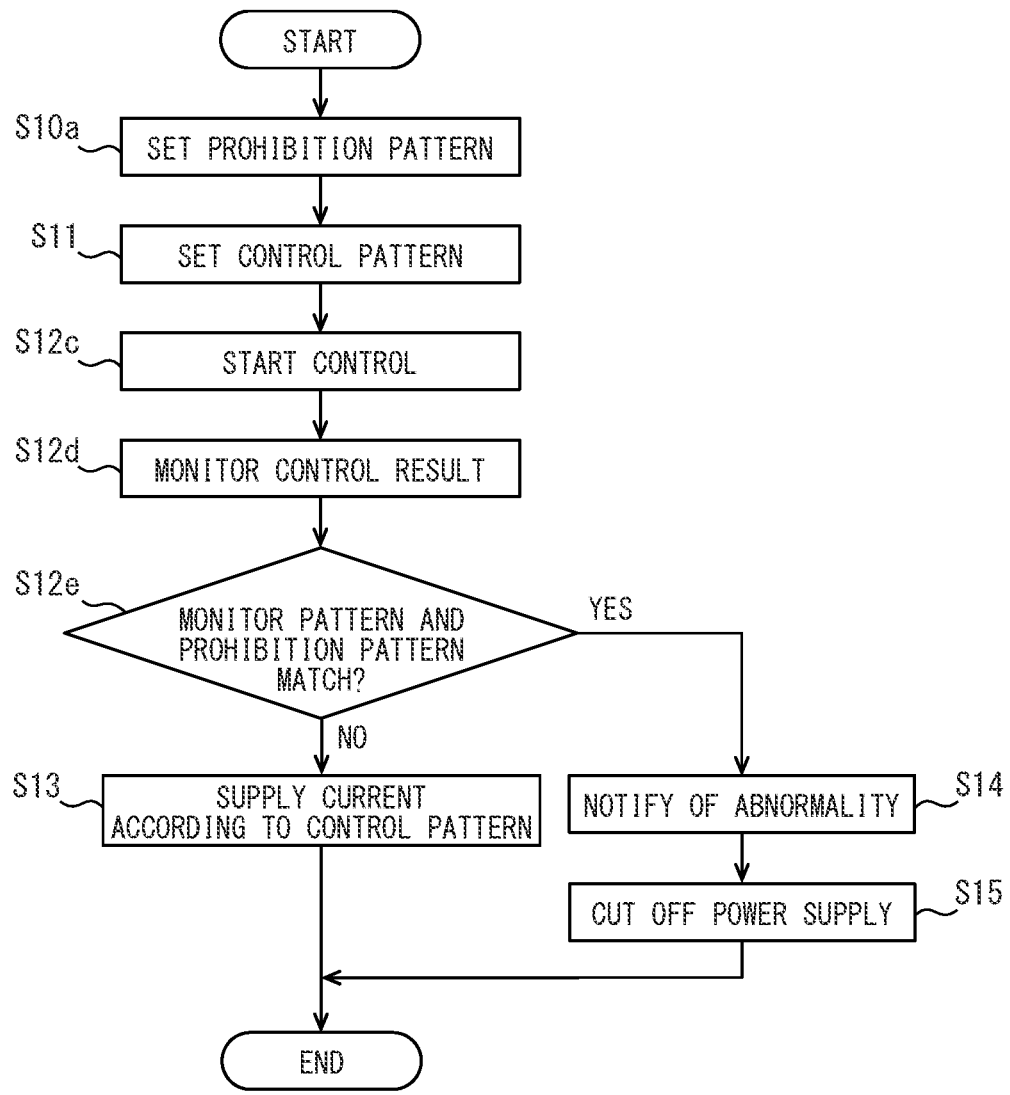
FIG. 13 is a flowchart showing the operation of the drive device according to the third embodiment.

As shown in FIG. 12, the register unit 60 has a third data register (3REG) 63 in which the monitor pattern is set. Then, the sequence circuit 30 sets the monitor pattern that is stored in the monitor register 84 in the third data register 63.

The operation of the drive device 103 will be described with reference to FIG. 13. When receiving the load drive signal, the drive device 103 starts the operation shown in the flowchart of FIG. 13. At this time, it is assumed that the power supply circuit 70 outputs a signal indicating that the power supply switch 500 is on. That is, each of the actuators 40*n* is supplied with an electric current.

In S12*c*, control is started. The drive IC 20 selectively turns the drive switches 301 to 305 on or off according to the control pattern stored in the control register 11. As a result, the drive IC 20 selectively supply the electric current to the actuators 40*n*.

In S12*d*, the control result is monitored. Each of the current detection units monitors the conduction state of the corresponding actuator 40*n*. The second comparator 83 outputs the monitor result indicating the conduction state of each of the actuators 40*n* monitored by each of the current detection units. Then, the monitor register 84 stores the monitor pattern that is the monitor result. Further, in the sequence circuit 30, the data loader loads the monitor pattern from the monitor register 84. Then, the data loader sets the loaded monitor pattern in the third data register 63. When the monitor pattern is set in the third data register 63, the monitor pattern is output to the first comparator 40.

In S12*e*, the monitor pattern and the prohibition pattern are compared. The first comparator 40 compares the monitor pattern set in the third data register 63 with the prohibition pattern 51 set in the second data register 62. The first comparator 40 proceeds to S13 when the monitor pattern differs from all the prohibition patterns 51. On the other hand, when the monitor pattern matches one of the prohibition patterns 51, the first comparator 40 proceeds to S14. For example, as described above, when the control pattern is 11100 and a ground fault occurs and the monitor pattern becomes 01100, the monitor pattern matches the fourth prohibition pattern 51.

The drive device 103 can have effects similar to the effects of the drive device 101. Further, the drive device 103 can determine an abnormality of the monitor pattern due to garbled bits of the monitor pattern stored in the monitor register 84. Further, the drive device 103 can determine an abnormality of the monitor pattern due to a ground fault in the current path between the current detection resistor 81 and each of the actuators 40*n*.

Fourth Embodiment

A drive device 104 according to a fourth embodiment will be described with reference to FIGS. 14 and 15. The drive device 104 has a comparison pattern different from the comparison pattern of the drive device 102. In the drive device 104, the same reference numerals are assigned to the same configuration as the drive device 102. Further, in the flowchart of FIG. 15, the same step number is assigned to the same process as that of the flowchart of FIG. 11.

The drive device 104 compares the monitor pattern with the determination pattern. Therefore, the monitor pattern can be said to be the comparison pattern. The monitor pattern is stored in the monitor register 84 in a manner similar to the drive device 101.

Figure 14:
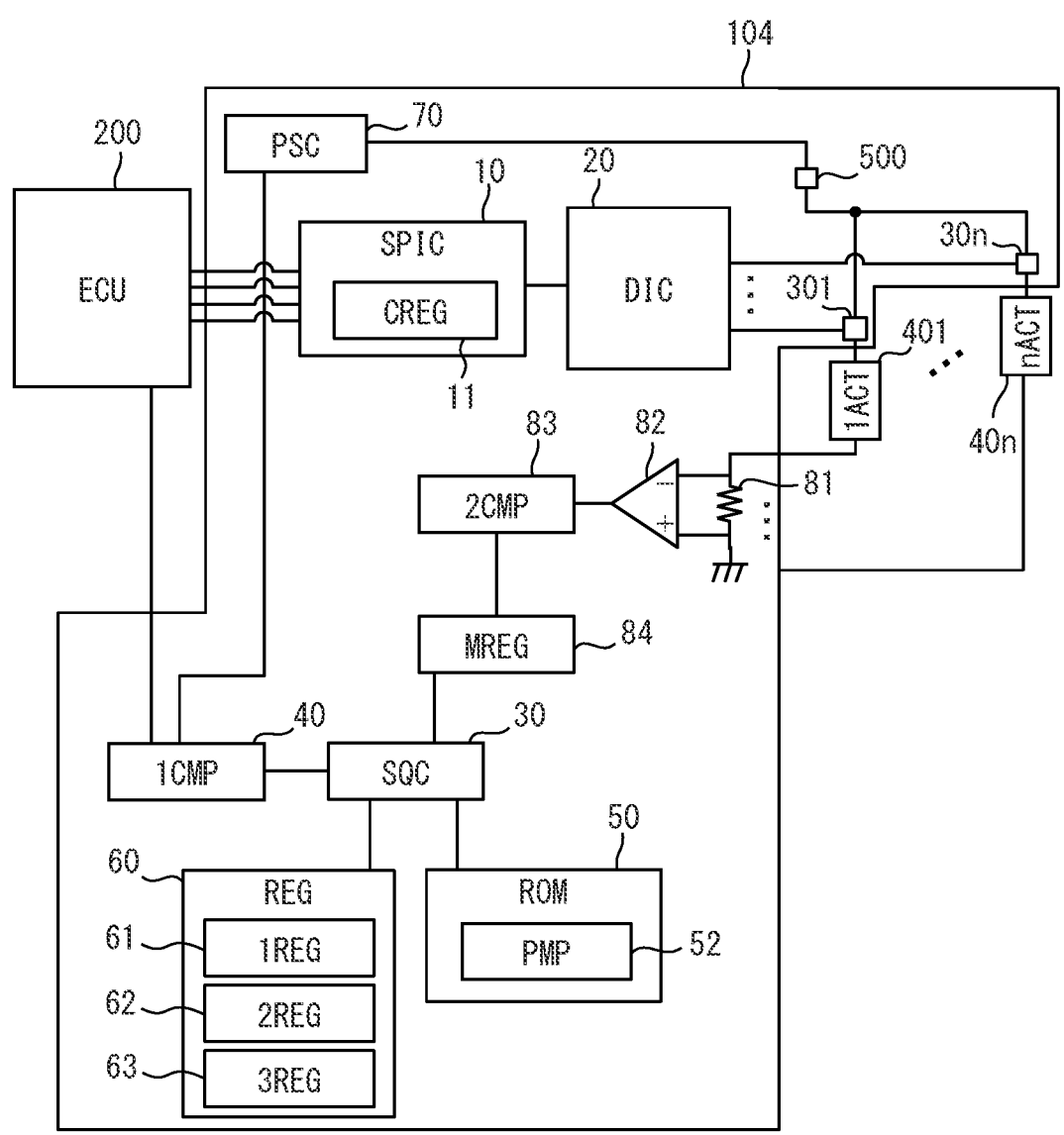
FIG. 14 is a circuit diagram showing a schematic configuration of a drive device according to a fourth embodiment.
Figure 15:
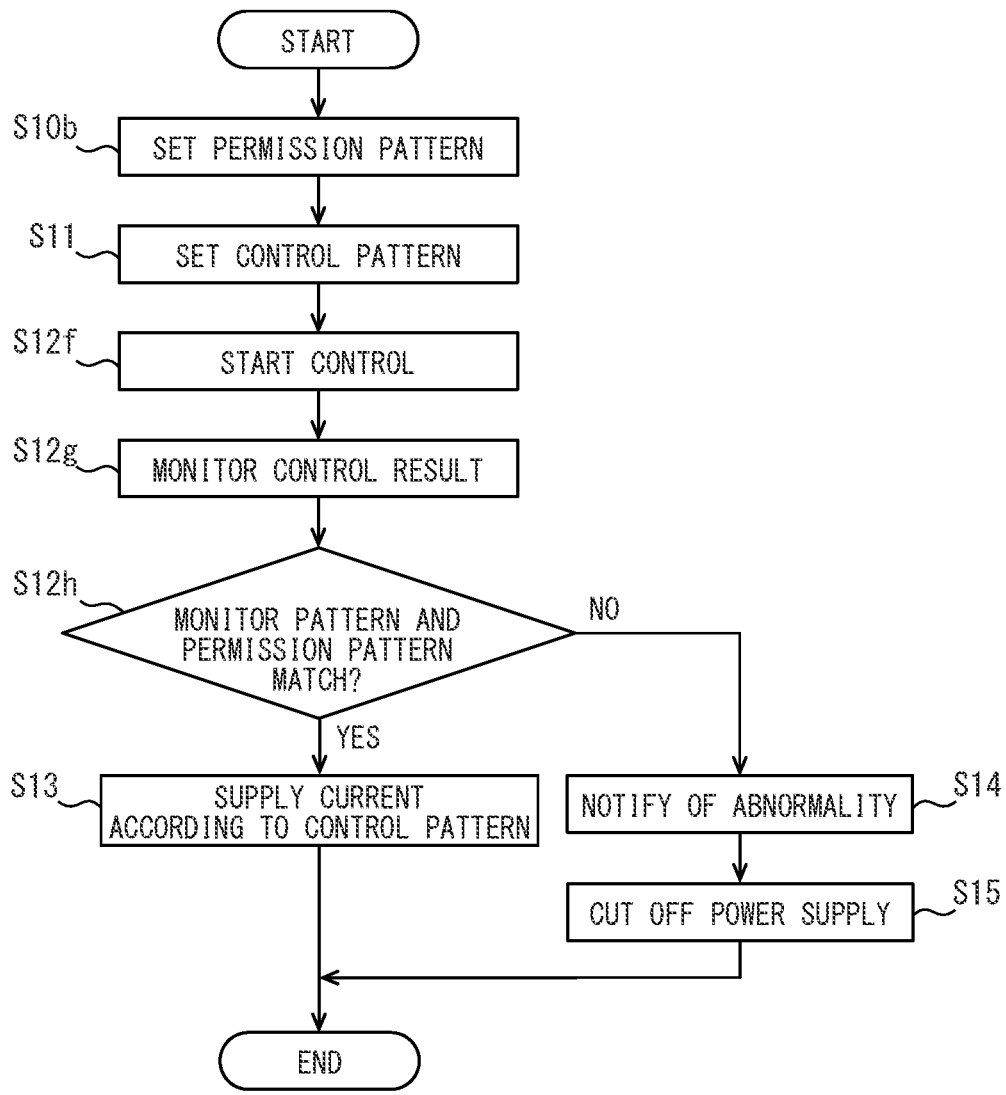
FIG. 15 is a flowchart showing the operation of the drive device according to the fourth embodiment.

As shown in FIG. 14, the register unit 60 has the third data register 63 in which the monitor pattern is set. Then, the sequence circuit 30 sets the monitor pattern that is stored in the monitor register 84 in the third data register 63.

The operation of the drive device 104 will be described with reference to FIG. 15. When receiving the load drive signal, the drive device 104 starts the operation shown in the flowchart of FIG. 15. At this time, it is assumed that the power supply circuit 70 outputs a signal indicating that the power supply switch 500 is on. That is, each of the actuators 40*n* is supplied with an electric current. Note that S12*f* and 12*g* are similar to S12*c* and S12*d*, respectively.

In S12*h*, the monitor pattern and the permission patterns are compared. The first comparator 40 compares the monitor pattern set in the third data register 63 with the permission pattern 52 set in the second data register 62. The first comparator 40 proceeds to S13 when the monitor pattern matches one of the permission patterns 52. On the other hand, the first comparator 40 proceeds to S14 when the monitor pattern differs from all the permission patterns 5.

The drive device 104 can have effects similar to the effects of the drive device 102. Further, the drive device 104 can determine an abnormality of the monitor pattern in a manner similar to the drive device 103.

Fifth Embodiment

Figure 16:
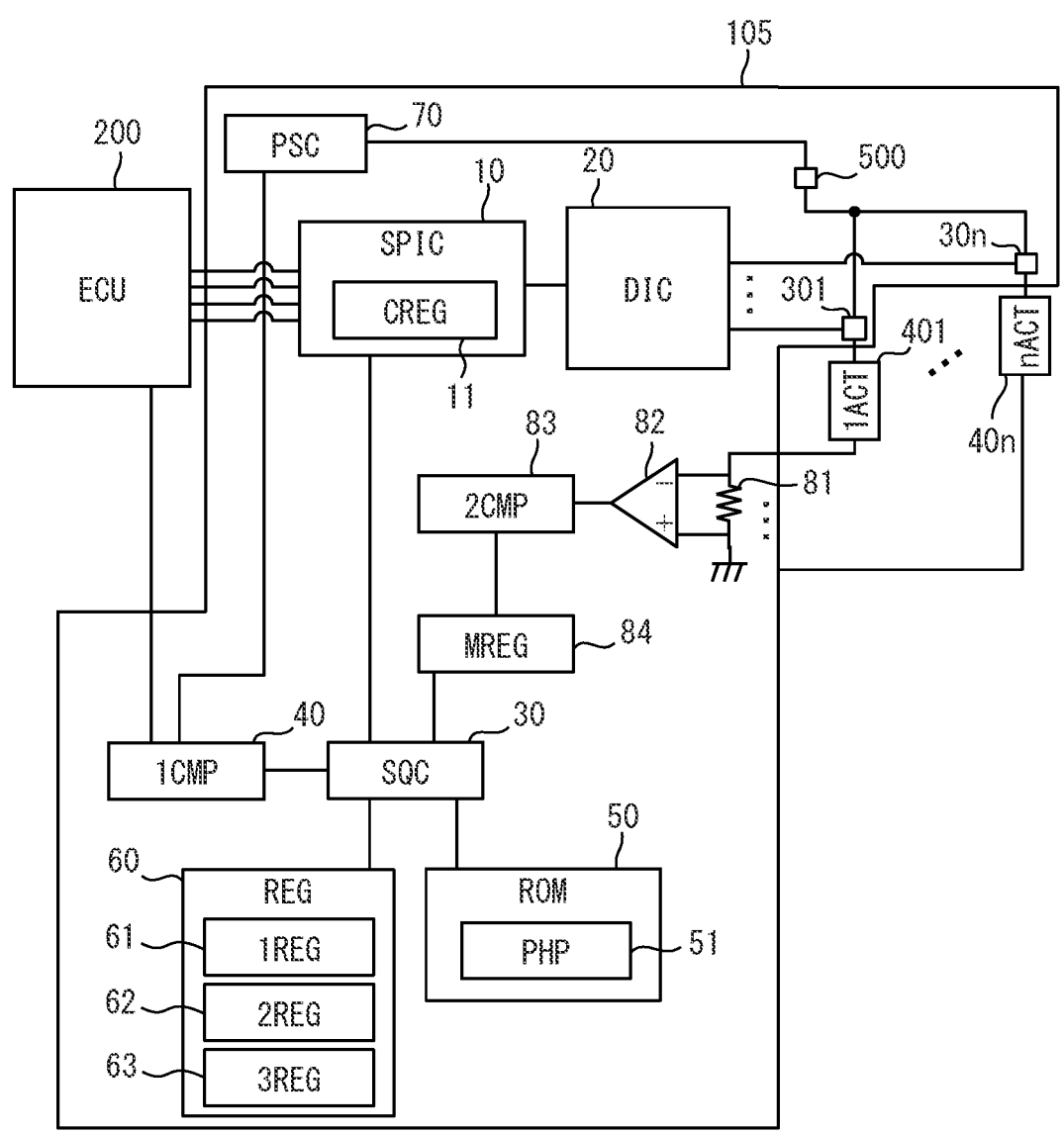
FIG. 16 is a circuit diagram showing a schematic configuration of a drive device according to a fifth embodiment.

A drive device 105 according to a fifth embodiment will be described with reference to FIG. 16. The drive device 105 has a different comparison pattern from the drive device 101 and the drive device 103. In the drive device 105, the same reference numerals are assigned to the same configurations as those of the drive device 101 and the drive device 103.

The drive device 105 compares the control pattern and the determination pattern, and also compares the monitor pattern and the determination pattern. Therefore, the control pattern and the monitor pattern can be said to be comparison patterns. The drive device 105 adopts the prohibition pattern 51 as the determination pattern.

The register unit 60 has the first data register 61, the second data register 62, and the third data register 63. The sequence circuit 30 sets the control pattern stored in the control register 11 in the first data register 61. The sequence circuit 30 sets the prohibition pattern 51 stored in the ROM 50 in the second data register 62. The sequence circuit 30 sets the monitor pattern that is stored in the monitor register 84 in the third data register 63.

The first comparator 40 compares the control pattern and the prohibition patterns as in the first embodiment (S12*a*).

The first comparator 40 proceeds to S13 when the control pattern differs from all the prohibition patterns 51. On the other hand, the first comparator 40 proceeds to S14 when the control pattern matches one the prohibition patterns 51.

Further, the first comparator 40 compares the monitor pattern and the prohibition patterns in a manner similar to the third embodiment (S12e). The first comparator 40 proceeds to S13 when the monitor pattern differs from all the prohibition patterns 51. On the other hand, the first comparator 40 proceeds to S14 when the monitor pattern matches one of the prohibition patterns 51.

The drive device 105 can have effects similar to the effects of the drive devices 101 and 103.

Sixth Embodiment

Figure 17:
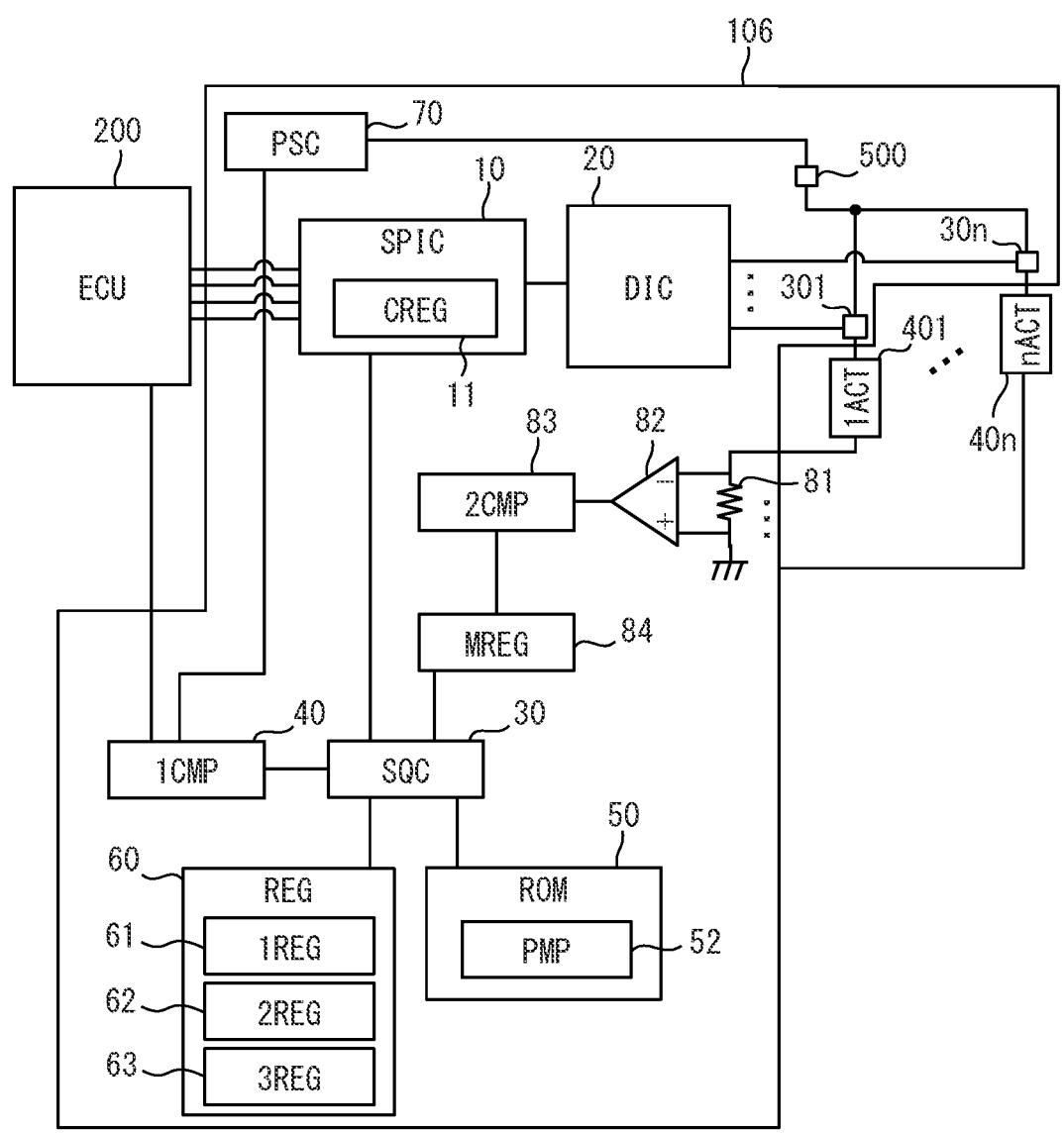
FIG. 17 is a circuit diagram showing a schematic configuration of a drive device according to a sixth embodiment.

A drive device 106 according to a sixth embodiment will be described with reference to FIG. 17. The drive device 106 has a different comparison pattern from the drive device 102 and the drive device 104. In the drive device 106, the same reference numerals are assigned to the same configurations as those of the drive device 102 and the drive device 104.

The drive device 106 compares the control pattern and the determination pattern, and also compares the monitor pattern and the determination pattern. Therefore, the control pattern and the monitor pattern can be said to be comparison patterns. The drive device 105 adopts the permission pattern 52 as the determination pattern. The sequence circuit 30 and the register unit 60 are similar to those of the drive device 105.

The first comparator 40 compares the control pattern and the permission patterns as in the second embodiment (S12b). The first comparator 40 proceeds to S13 when the control pattern matches one of the permission patterns 52. On the other hand, the first comparator 40 proceeds to S14 when the control pattern differs from all the permission patterns 52.

Further, the first comparator 40 compares the monitor pattern and the permission patterns in a manner similar to the fourth embodiment (S12h). The first comparator 40 proceeds to S13 when the monitor pattern matches one of the permission patterns 52. On the other hand, the first comparator 40 proceeds to S14 when the monitor pattern differs from all the permission patterns 52.

The drive device 106 can have effects similar to the effects of the drive devices 102 and 104.

Although the present disclosure has been described in accordance with the embodiments, it is understood that the present disclosure is not limited to such embodiments or structures. The present disclosure encompasses various modifications and variations within the scope of equivalents. In addition, while the various elements are shown in various combinations and configurations, which are exemplary, other combinations and configurations, including more, less or only a single element, are also within the spirit and scope of the present disclosure.

What is claimed is:

1. A drive circuit configured to electrically conduct a plurality of loads mounted on a vehicle and comprising:
   a control storage configured to store a control pattern that includes a signal instructing a conduction state of each of the plurality of loads and converted from a load control signal that is received from an electronic control unit including a microcomputer and disposed outside the drive circuit and that instructs the conduction state of each of the plurality of loads;
   a driver configured to control a plurality of semiconductor switches according to the control pattern, the plurality of semiconductor switches corresponding to the plurality of loads, respectively;
   a determination storage configured to store at least one determination pattern for determining an abnormality of the control pattern, the at least one determination pattern being limited to either (i) a prohibited conduction pattern that indicates the conduction state of each of the plurality of loads which is prohibited or (ii) a permitted conduction pattern that indicates the conduction state of each of the plurality of loads which is permitted;
   a comparator configured to compare the at least one determination pattern and the control pattern, and determine that the abnormality of the control pattern has occurred in response to that at least one of the at least one determination pattern and the control pattern satisfy a predetermined correspondence relationship; and
   a power supply circuit configured to provide or cut off a power supply to the plurality of loads, wherein
   the comparator is further configured to output abnormal signals to the power supply circuit and the electronic control unit disposed outside the drive circuit when determining that the abnormality of the control pattern has occurred.

2. The drive circuit according to claim 1, wherein
   the determination storage is further configured to store a prohibition pattern as the at least one determination pattern,
   the prohibition pattern is prohibited as the conduction state of each of the plurality of loads, and
   the comparator is further configured to determine that the abnormality of the control pattern has occurred in response to that the prohibition pattern and the control pattern match.

3. The drive circuit according to claim 1, wherein
   the determination storage is further configured to store a permission pattern as the at least one determination pattern,
   the permission pattern is permitted as the conduction state of each of the plurality of loads, and
   the comparator is further configured to determine that the abnormality of the control pattern has occurred in response to that the permission pattern and the control pattern differ.

4. The drive circuit according to claim 1, wherein
   the power supply circuit is configured to cut off the power supply to the plurality of loads in response to the abnormal signals output from the comparator.

5. The drive circuit according to claim 1, wherein
   each of the control pattern and the at least one determination pattern has a plurality of bits of a plurality of addresses that correspond to the plurality of loads, respectively, and
   each of the plurality of bits represents the conduction state of corresponding one of the plurality of loads by 1 or 0.

6. The drive circuit according to claim 1, wherein
   the control pattern is generated by converting the load control signal into parallel data.

7. A drive circuit configured to electrically conduct a plurality of loads mounted on a vehicle and comprising:
   a driver configured to control a plurality of semiconductor switches according to a control pattern, the plurality of semiconductor switches corresponding to the plurality of loads, respectively, and the control pattern including a signal instructing a conduction state of each of the plurality of loads and converted from a load control signal that is received from an electronic control unit including a microcomputer and disposed outside the drive circuit and that instructs the conduction state of each of the plurality of loads;

a monitor storage configured to store a monitor pattern that is a result of monitoring the conduction state of each of the plurality of loads;

a determination storage configured to store at least one determination pattern for determining an abnormality of the monitor pattern, the at least one determination pattern being limited to either (i) a prohibited conduction pattern that indicates the conduction state of each of the plurality of loads which is prohibited or (ii) a permitted conduction pattern that indicates the conduction state of each of the plurality of loads which is permitted;

a comparator configured to compare the at least one determination pattern and the monitor pattern, and determine that the abnormality of the monitor pattern has occurred in response to that at least one of the at least one determination pattern and the monitor pattern satisfy a predetermination correspondence relationship; and a power supply circuit configured to provide or cut off a power supply to the plurality of loads, wherein the comparator is further configured to output abnormal signals to the power supply circuit and the electronic control unit disposed outside the drive circuit when determining that the abnormality of the monitor pattern has occurred.

8. The drive circuit according to claim 7, wherein
the determination storage is further configured to store a prohibition pattern as the at least one determination pattern,
the prohibition pattern is prohibited as the conduction state of each of the plurality of loads, and
the comparator is further configured to determine that the abnormality of the monitor pattern has occurred in response to that the prohibition pattern and the monitor pattern match.

9. The drive circuit according to claim 7, wherein
the determination storage is further configured to store a permission pattern as the at least one determination pattern,
the permission pattern is permitted as the conduction state of each of the plurality of loads, and
the comparator is further configured to determine that the abnormality of the monitor pattern has occurred in response to that the permission pattern and the monitor pattern differ.

10. The drive circuit according to claim 7, further comprising
the power supply circuit is configured to cut off the power supply to the plurality of loads in response to the abnormal signals output from the comparator.

11. The drive circuit according to claim 7, wherein
each of the control pattern, the monitor pattern, and the at least one determination pattern has a plurality of bits of a plurality of addresses that correspond to the plurality of loads, respectively, and
each of the plurality of bits represents the conduction state of corresponding one of the plurality of loads by 1 or 0.

12. The drive circuit according to claim 7, wherein
the control pattern is generated by converting the load control signal into parallel data.

13. A drive circuit configured to electrically conduct a plurality of loads mounted on a vehicle and comprising:

a control storage configured to store a control pattern that includes a signal instructing a conduction state of each of the plurality of loads and converted from a load control signal that is received from an electronic control unit including a microcomputer and disposed outside the drive circuit and that instructs the conduction state of each of the plurality of loads;

a driver configured to control a plurality of semiconductor switches according to the control pattern, the plurality of semiconductor switches corresponding to the plurality of loads, respectively;

a monitor storage configured to store a monitor pattern that is a result of monitoring the conduction state of each of the plurality of loads;

a determination storage configured to store at least one determination pattern for determining an abnormality of the control pattern and an abnormality of the monitor pattern, the at least one determination pattern being limited to either (i) a prohibited conduction pattern indicating the conduction state of each of the plurality of loads which is prohibited or (ii) a permitted conduction pattern that indicates the conduction state of each of the plurality of loads which is permitted;

a comparator configured to compare the at least one determination pattern with the control pattern and the monitor pattern, determine that the abnormality of the control pattern has occurred in response to that at least one of the at least one determination pattern and the control pattern satisfy a predetermined correspondence relationship, and determine that the abnormality of the monitor pattern has occurred in response to that the determination pattern and the monitor pattern satisfy a predetermined correspondence relationship; and a power supply circuit configured to provide or cut off a power supply to the plurality of loads, wherein the comparator is further configured to output abnormal signals to the power supply circuit and the electronic control unit disposed outside the drive circuit when determining that the abnormality of the control pattern of the abnormality of the monitor pattern has occurred.

14. The drive circuit according to claim 13, wherein
the determination storage is further configured to store a prohibition pattern as the at least one determination pattern,
the prohibition pattern is prohibited as the conduction state of each of the plurality of loads, and
the comparator is further configured to determine that the abnormality of the control pattern has occurred in response to that the prohibition pattern and the control pattern match, and determine that the abnormality of the monitor pattern has occurred in response to that the prohibition pattern and the monitor pattern match.

15. The drive circuit according to claim 13, wherein
the determination storage is further configured to store a permission pattern as the at least one determination pattern,
the permission pattern is permitted as the conduction state of each of the plurality of loads, and
the comparator is further configured to determine that the abnormality of the control pattern has occurred in response to that the permission pattern and the control pattern differ, and determine that the abnormality of the monitor pattern has occurred in response to that the permission pattern and the monitor pattern differ.

16. The drive circuit according to claim 13, further comprising
the power supply circuit is configured to cut off the power supply to the plurality of loads in response to the abnormal signals output from the comparator.

17. The drive circuit according to claim 13, wherein
each of the control pattern, the monitor pattern, and the at least one determination pattern has a plurality of bits of a plurality of addresses that correspond to the plurality of loads, respectively, and
each of the plurality of bits represents the conduction state of corresponding one of the plurality of loads by 1 or 0.

18. The drive circuit according to claim 13, wherein
the control pattern is generated by converting the load control signal into parallel data.

19. A load drive system comprising:
a drive circuit configured to electrically conduct a plurality of loads mounted on a vehicle; and
an electronic control unit including a microcomputer and disposed outside the drive circuit, wherein
the electronic control unit is configured to transmit a load control signal to the drive circuit, and the load control signal instructs a conduction state of each of the plurality of loads,
the drive circuit includes:
 a control storage configured to store a control pattern that includes a signal instructing a conduction state of each of the plurality of loads and converted from the load control signal;
 a driver configured to control a plurality of semiconductor switches according to the control pattern, the plurality of semiconductor switches corresponding to the plurality of loads, respectively;
 a determination storage configured to store at least one determination pattern for determining an abnormality of the control pattern, the at least one determination pattern being limited to either (i) a prohibited conduction pattern that indicates the conduction state of each of the plurality of loads which is prohibited or (ii) a permitted conduction pattern that indicates the conduction state of each of the plurality of loads which is permitted;
 a comparator configured to compare the at least one determination pattern and the control pattern, and determine that the abnormality of the control pattern has occurred in response to that at least one of the at least one determination pattern and the control pattern satisfy a predetermined correspondence relationship; and
 a power supply circuit configured to provide or cut off a power supply to the plurality of loads, and
the comparator is further configured to output abnormal signals to the power supply circuit and the electronic control unit disposed outside the drive circuit when determining that the abnormality of the control pattern has occurred.

20. A load drive system comprising:
a drive circuit configured to electrically conduct a plurality of loads mounted on a vehicle; and
an electronic control unit including a microcomputer and disposed outside the drive circuit, wherein
the electronic control unit is configured to transmit a load control signal to the drive circuit, and the load control signal instructs a conduction state of each of the plurality of loads,
the drive circuit includes:
 a driver configured to control a plurality of semiconductor switches according to a control pattern, the control pattern including a signal instructing a conduction state of each of the plurality of loads and converted from the load control signal, the plurality of semiconductor switches corresponding to the plurality of loads, respectively;
 a monitor storage configured to store a monitor pattern that is a result of monitoring the conduction state of each of the plurality of loads;
 a determination storage configured to store at least one determination pattern for determining an abnormality of the monitor pattern, the at least one determination pattern being limited to either (i) a prohibited conduction pattern that indicates the conduction state of each of the plurality of loads which is prohibited or (ii) a permitted conduction pattern that indicates the conduction state of each of the plurality of loads which is permitted;
 a comparator configured to compare the at least one determination pattern and the monitor pattern, and determine that the abnormality of the monitor pattern has occurred in response to that at least one of the at least one determination pattern and the monitor pattern satisfy a predetermination correspondence relationship; and
 a power supply circuit configured to provide or cut off a power supply to the plurality of loads, and
the comparator is further configured to output abnormal signals to the power supply circuit and the electronic control unit disposed outside the drive circuit when determining that the abnormality of the monitor pattern has occurred.

21. A load drive system comprising:
a drive circuit configured to electrically conduct a plurality of loads mounted on a vehicle; and
an electronic control unit including a microcomputer and disposed outside the drive circuit, wherein
the electronic control unit is configured to transmit a load control signal to the drive circuit, and the load control signal instructs a conduction state of each of the plurality of loads,
the drive circuit includes:
 a control storage configured to store a control pattern that includes a signal instructing a conduction state of each of the plurality of loads and converted from the load control signal;
 a driver configured to control a plurality of semiconductor switches according to the control pattern, the plurality of semiconductor switches corresponding to the plurality of loads, respectively;
 a monitor storage configured to store a monitor pattern that is a result of monitoring the conduction state of each of the plurality of loads;
 a determination storage configured to store at least one determination pattern for determining an abnormality of the control pattern and an abnormality of the monitor pattern, the at least one determination pattern being limited to either (i) a prohibited conduction pattern indicating the conduction state of each of the plurality of loads which is prohibited or (ii) a permitted conduction pattern that indicates the conduction state of each of the plurality of loads which is permitted;
 a comparator configured to compare the at least one determination pattern with the control pattern and the monitor pattern, determine that the abnormality of the control pattern has occurred in response to that at least one of the at least one determination pattern and the control pattern satisfy a predetermined correspondence relationship, and determine that the abnormality of the monitor pattern has occurred in response to that the determination pattern and the monitor pattern satisfy a predetermined correspondence relationship; and a power supply circuit configured to provide or cut off a power supply to the plurality of loads, and the comparator is further configured to output abnormal signals to the power supply circuit and the electronic control unit disposed outside the drive circuit when determining that the abnormality of the control pattern of the abnormality of the monitor pattern has occurred.

* * * * *